United States Patent
Moriura et al.

(10) Patent No.: US 12,253,534 B2
(45) Date of Patent: Mar. 18, 2025

(54) SAMPLE ANALYZER AND SAMPLE ANALYSIS METHOD

(71) Applicant: SYSMEX CORPORATION, Kobe (JP)

(72) Inventors: Kazuma Moriura, Kobe (JP); Hiroshi Kurono, Kobe (JP)

(73) Assignee: Sysmex Corporation, Hyogo (JP)

( * ) Notice: Subject to any disclaimer, the term of this patent is extended or adjusted under 35 U.S.C. 154(b) by 737 days.

(21) Appl. No.: 16/800,172

(22) Filed: Feb. 25, 2020

(65) Prior Publication Data
US 2020/0278363 A1 Sep. 3, 2020

(30) Foreign Application Priority Data
Feb. 28, 2019 (JP) .................................. 2019-036661

(51) Int. Cl.
*G01N 35/00* (2006.01)
*B01L 3/00* (2006.01)
(Continued)

(52) U.S. Cl.
CPC .......... *G01N 35/00732* (2013.01); *B01L 3/50* (2013.01); *B01L 9/00* (2013.01);
(Continued)

(58) Field of Classification Search
CPC .... G01N 35/00732; G01N 35/02; B01L 3/50; B01L 9/00; B01L 2300/021; B01L 2300/025; B01L 2300/0627
See application file for complete search history.

(56) References Cited

U.S. PATENT DOCUMENTS

2005/0013736 A1* 1/2005 McKeever ........... G01N 35/025
422/65
2006/0004524 A1* 1/2006 Aucoin .................. G16H 10/40
702/19
(Continued)

FOREIGN PATENT DOCUMENTS

CN 102037363 A 4/2011
CN 103189750 A 7/2013
(Continued)

OTHER PUBLICATIONS

The Chinese office action issued on Jun. 29, 2023 in a counterpart Chinese patent application No. 202010125099.3.
(Continued)

*Primary Examiner* — Jill A Warden
*Assistant Examiner* — Curtis A Thompson
(74) *Attorney, Agent, or Firm* — Crowell & Moring LLP

(57) ABSTRACT

Disclosed is a sample analyzer including a storage section configured to store a plurality of containers for containing a sample, and including a discharge port through which the container is discharged; a production lot information acquisition unit that acquires production lot information on a production lot of the container; an analysis processing unit that performs analysis processing of the sample contained in the container discharged through the discharge port; a recorder that records the production lot information, an analysis result of the sample contained in the container, and time information related to time of analyzing the sample; and a display information generation unit that generates, based on information recorded in the recorder, display information for displaying at least one analysis result of at least one sample analyzed during a period of time on a display unit in a manner that associates the at least one analysis result with the production lot information.

9 Claims, 21 Drawing Sheets

(51) Int. Cl.
    *B01L 9/00*    (2006.01)
    *G01N 35/02*   (2006.01)

(52) U.S. Cl.
    CPC ........ *G01N 35/02* (2013.01); *B01L 2300/021* (2013.01); *B01L 2300/025* (2013.01); *B01L 2300/0627* (2013.01)

(56) References Cited

U.S. PATENT DOCUMENTS

| | | | | |
|---|---|---|---|---|
| 2006/0013729 | A1* | 1/2006 | Carey | B01F 29/331 422/63 |
| 2006/0157549 | A1* | 7/2006 | Stein | G16H 40/20 235/375 |
| 2006/0210435 | A1* | 9/2006 | Alavie | G01N 35/0092 422/65 |
| 2007/0269342 | A1* | 11/2007 | Kitagawa | G01N 35/04 422/64 |
| 2008/0240984 | A1 | 10/2008 | Wakamiya et al. | |
| 2008/0240988 | A1* | 10/2008 | Wakamiya | G01N 35/00693 422/68.1 |
| 2012/0129247 | A1* | 5/2012 | Tanoshima | G01N 35/04 435/286.1 |
| 2013/0011298 | A1* | 1/2013 | Itou | G01N 35/00623 422/73 |
| 2013/0316461 | A1* | 11/2013 | Fujita | G01N 33/5005 436/63 |
| 2014/0295563 | A1 | 10/2014 | Matsuura | |
| 2018/0113142 | A1 | 4/2018 | Nakano | |
| 2019/0351419 | A1 | 11/2019 | Fujita et al. | |

FOREIGN PATENT DOCUMENTS

| | | | | |
|---|---|---|---|---|
| CN | 104076161 | A | | 10/2014 |
| CN | 104422782 | A | | 3/2015 |
| CN | 107192835 | A | | 9/2017 |
| CN | 107407686 | A | | 11/2017 |
| CN | 108347487 | A | | 7/2018 |
| CN | 108922581 | A | | 11/2018 |
| EP | 3267202 | A1 | | 1/2018 |
| JP | 2002-350451 | A | | 12/2002 |
| JP | 2005-274469 | A | | 10/2005 |
| JP | 2008241670 | A | * | 10/2008 ....... G01N 35/00732 |
| JP | 2009042049 | A | | 2/2009 |
| JP | 2013-19682 | A | | 1/2013 |
| JP | 2014-194349 | A | | 10/2014 |
| JP | 2017-129596 | A | | 7/2017 |
| WO | 2009/031455 | A1 | | 3/2009 |
| WO | 2016/140017 | A1 | | 9/2016 |
| WO | 2018/173560 | A1 | | 9/2018 |

OTHER PUBLICATIONS

The Japanese Decision of Refusal issued on Sep. 1, 2020 in a counterpart Japanese patent application No. 2019-036661.
Japanese Office Action issued on Dec. 1, 2021 in Japanese patent application No. 2020-199845.
The extended European search report issued on Jul. 31, 2020 in a counterpart European patent application No. 20159769.7.
The Japanese Office Action issued on Feb. 12, 2020 in a counterpart Japanese patent application No. 2019-036661.
The Chinese Office Action issued on Jan. 9, 2024 in a counterpart Chinese patent application No. 202010125099.3.

* cited by examiner

FIG. 5
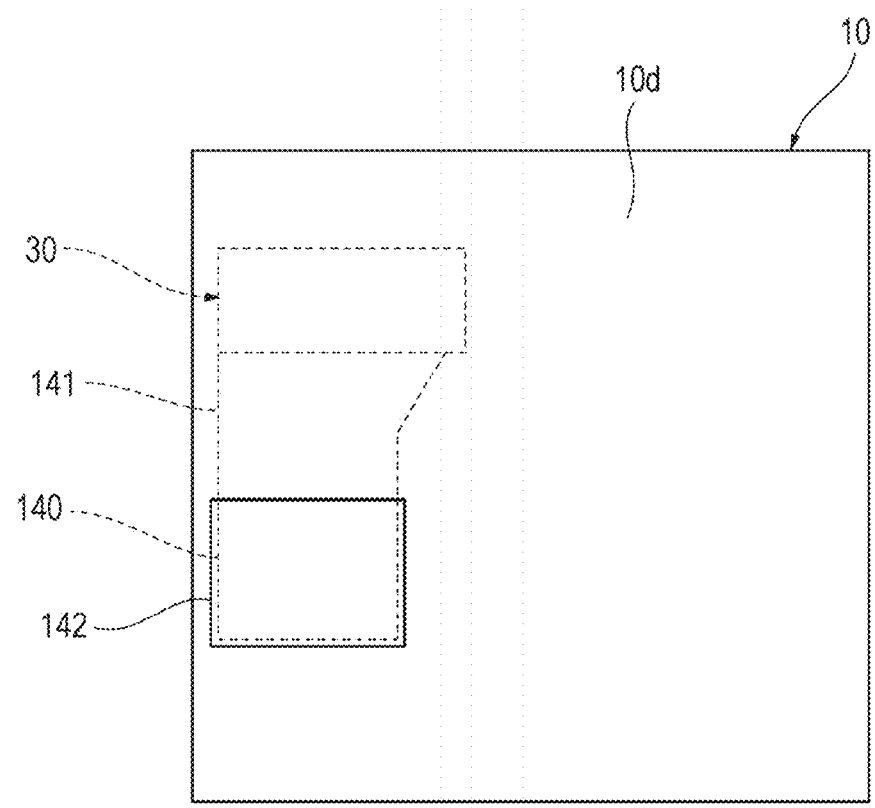
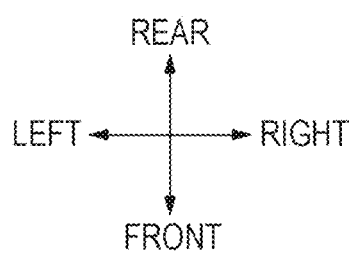

LEFT ←→ RIGHT

FIG. 15

| SAMPLE NUMBER | PRODUCTION LOT NUMBER | ANALYSIS START TIME | ANALYSIS END TIME | ANALYSIS RESULT | | |
|---|---|---|---|---|---|---|
| | | | | AAA | BBB | CCC |
| 11_11 | A1000-001 | 2019/01/10 10:00 | 2019/01/10 11:00 | **** | **** | **** |
| 11_12 | A1000-001 | 2019/01/10 10:00 | 2019/01/10 11:00 | **** | **** | **** |
| 11_13 | A1000-001 | 2019/01/10 10:30 | 2019/01/10 11:30 | **** | **** | **** |
| ... | ... | ... | ... | ... | ... | ... |
| 20_24 | A1000-001 | 2019/01/13 11:00 | 2019/01/13 11:30 | **** | **** | **** |
| 20_25 | U1000-011 | 2019/01/13 11:00 | 2019/01/13 11:45 | **** | **** | **** |
| 20_26 | U1000-011 | 2019/01/13 11:00 | 2019/01/13 12:00 | **** | **** | **** |
| 20_27 | U1000-011 | 2019/01/13 12:00 | 2019/01/13 12:45 | **** | **** | **** |
| ... | ... | ... | ... | ... | ... | ... |
| 30_05 | U1000-011 | 2019/01/16 16:00 | 2019/01/16 17:00 | **** | **** | **** |
| 30_06 | R2000-003 | 2019/01/16 16:15 | 2019/01/16 16:45 | **** | **** | **** |
| 30_07 | R2000-003 | 2019/01/16 16:30 | 2019/01/16 17:15 | **** | **** | **** |
| ... | ... | ... | ... | ... | ... | ... |

FIG. 17

2019/01/13 ANALYSIS RESULT

| SAMPLE NUMBER | PRODUCTION LOT NUMBER | START TIME | END TIME | ANALYSIS RESULT | | |
|---|---|---|---|---|---|---|
| | | | | AAA | BBB | CCC |
| ... | ... | ... | ... | ... | ... | ... |
| 20_24 | A1000-001 | 11:00 | 11:30 | **** | **** | **** |
| 20_25 | U1000-011 | 11:00 | 11:45 | **** | **** | **** |
| 20_26 | U1000-011 | 11:00 | 12:00 | **** | **** | **** |
| 20_27 | U1000-011 | 12:00 | 12:45 | Error | Error | Error |
| ... | ... | ... | ... | ... | ... | ... |

SAMPLE ANALYZER AND SAMPLE ANALYSIS METHOD

RELATED APPLICATIONS

This application claims priority to Japanese Patent Application No. 2019-036661, filed on Feb. 28, 2019, the entire content of which is incorporated herein by reference.

BACKGROUND OF THE INVENTION

1. Field of the Invention

The present invention relates to a sample analyzer and a sample analysis method.

2. Description of the Related Art

Blood analysis such as blood coagulation analysis and immune serum analysis is usually performed using an analyzer. In general, in such an analyzer, a sample contained in a sample container (such as a blood collection tube) is transferred to a container such as a cuvette used for analysis, and a reagent is dispensed into the container to be mixed with the sample. Then, the container is heated and then is conveyed to an analysis unit where the sample is analyzed.

The containers used in the above-described analyzer are stored in advance in the analyzer. Thus, the analyzer includes a storage section storing multiple empty containers and a conveyance unit that conveys the containers from the storage section to a dispensing position where the sample contained in the sample container is dispensed.

For example, an analyzer described in US 2014-295563 as illustrated in FIG. 20 includes a supply mechanism unit 500 that supplies a cuvette serving as a container. The supply mechanism unit 500 includes a storage section 501 that stores a plurality of cuvettes, and a take-out unit 502 for taking out the cuvette from the storage section 501. In the take-out unit 502, the cuvettes are placed on a swing rail 503 attached to the lowest part inside the storage section 501, and are conveyed out from the storage section 501 as the swing rail 503 swings.

When the number of cuvettes in the storage section 501 becomes zero or small, a user has to replenish the storage section 501 with empty cuvettes. Some users may replenish the storage section 501 with cuvettes by depositing a large number of (several hundreds or thousands) cuvettes into the storage section 501 at once from a bag containing the cuvettes. This results in the cuvettes being damaged while being deposited into the storage section 501. The cuvette thus damaged might involve a risk of a result of the analysis on the sample stored therein being abnormal. As one method for identifying the cause of the abnormality, a cuvette associated with the analysis result indicating abnormality may be traced.

In the description in Japanese Patent Application Laid-Open No. 2002-350451, a content of a test on a sample is managed together with information about consumables such as reagent, sample container, and regularly replaced parts. In the description in Japanese Patent Application Laid-Open No. 2002-350451, the information about consumables includes a production lot number associated with a sample container.

SUMMARY OF THE INVENTION

The scope of the present invention is defined solely by the appended claims, and is not affected to any degree by the statements within this summary.

A conventional analyzer, as described in Japanese Patent Application Laid-Open No. 2002-350451, requires a consumable management technology that improves the traceability of consumables. However, no specific contents of the management for consumables and test contents are mentioned in Japanese Patent Application Laid-Open No. 2002-350451. Therefore, the conventional consumable management technology cannot sufficiently satisfy the request described above.

As illustrated in FIG. 1, FIG. 4 to FIG. 10, FIG. 13, and FIG. 17, a sample analyzer (1) according to a first aspect includes a storage section (131) configured to store a plurality of containers for containing a sample, and including a discharge port (150) through which the container is discharged; a production lot information acquisition unit (263) that acquires production lot information (LI) on a production lot of the containers; an analysis processing unit (264) that performs analysis processing of the sample contained in the container discharged through the discharge port (150); a recorder (270) that records the production lot information (LI), an analysis result (RA) of the sample contained in the container, and time information related to time of analyzing the sample; and a display information generation unit (267) that generates, based on information recorded in the recorder, display information for displaying at least one analysis result (RA) of at least one sample analyzed during a period of time on a display unit (300) in a manner that associates the at least one analysis result (RA) with the production lot information (LI).

According to the above aspect, the sample analyzer (1) generates, based on information recorded in the recorder, display information for displaying at least one analysis result (RA) of at least one sample analyzed during a period of time on a display unit (300) in a manner that associates the at least one analysis result (RA) with the production lot information (LI). Thus, for example, the production lot information of the container associated with an analysis result indicating the occurrence of abnormality can be estimated with a certain level of accuracy. Therefore, the traceability of the containers that can accommodate the sample can be improved.

As illustrated in FIG. 13 and FIGS. 18A and 18B, in the sample analyzer (1), the display information generation unit (267) may generate the display information for displaying the production lot information (LI) on the display unit (300) in a predetermined display manner.

According to the above aspect, the display information for displaying the production lot information (LI) on the display unit (300) in a predetermined display manner is generated. Therefore, the production lot information (LI) on the containers supplied to the storage section (131) can be easily recognized at a glance.

As illustrated in FIG. 13 and FIGS. 18A and 18B, in the sample analyzer (1), the display information generation unit (267) may generate first display information for displaying production lot information (LI) on the container already stored in the storage section (131) on the display unit, (300) and when production lot information (LI) on a container newly supplied to the storage section (131) is acquired, the display information generation unit (267) may generate second display information for displaying the production lot information (LI) on the display unit (300).

According to the above aspect, the display information generation unit (267) generates the second display information after generating the first display information. Therefore, the time when the production lot information is changed can be recognized with a certain level of accuracy.

As illustrated in FIG. 13 and FIGS. 18A and 18B, in the sample analyzer (1), the display information generation unit (267) may generate display information for displaying production lot information (LI) on a container newly supplied to the storage section (131) on the display unit (300), when a predetermined amount of containers already stored in the storage section (131) are discharged from the storage section (131) or a predetermined period of time elapses after the production lot information (LI) on the container newly supplied to the storage section (131) is acquired.

According to the above aspect, the display information is generated when certain conditions are satisfied as described above after the production lot information (LI) on the container newly supplied to the storage section is acquired. Thus, the time when the production lot information has been changed can be more accurately recognized.

As illustrated in FIGS. 13 and 19, in the sample analyzer (1), the display information generation unit (267) may generate information for prompting supplying of the container when an amount of the containers stored in the storage section (131) decreases to or below a set amount.

According to the above aspect, for example, when the amount of the containers stored in the storage section (131) has decreased, the supplying of the container is prompted. Thus, the replenishing of containers can be prompted at an appropriate timing.

As illustrated in FIGS. 4, 13, and 19, the sample analyzer (1) may further include a sensor (350) that is disposed at a predetermined height from a bottom part (131e) of the storage section (131) and is configured to detect the container stored in the storage section (131), in which the display information generation unit (267) may generate information for prompting supplying of the container based on a detection result by the sensor (350).

According to the above aspect, for example, it is possible to easily recognize that the amount of the containers stored in the storage section (131) has decreased, whereby the replenishing of containers can be prompted at a more appropriate timing.

As illustrated in FIG. 8, FIG. 9, FIG. 13, and FIG. 19, the sample analyzer (1) may further include a sensor (400) that is disposed at the discharge port (150) and is configured to detect discharging of the container stored in the storage section (131), in which the display information generation unit (267) may generate information for prompting supplying of the container when a predetermined amount or more of the containers are discharged through the discharge port (150).

According to the above aspect, for example, it is possible to easily recognize that the amount of the containers stored in the storage section (131) has decreased, whereby the replenishing of containers can be prompted at a more appropriate timing.

As illustrated in FIG. 4, FIG. 8, FIG. 9, and FIG. 13, the sample analyzer (1) may further include a first sensor that is disposed at a predetermined height from a bottom part (131e) of the storage section (131) and is configured to detect the container stored in the storage section (131); a second sensor that is disposed at the discharge port (150) and is configured to detect discharging of the container stored in the storage section (131); and a calculation unit (266) that calculates an amount of the containers discharged through the discharge port (150) as a used amount based on a detection result by the second sensor, in which the calculation unit (266) may calculate the amount of the containers discharged through the discharge port (150) as the used amount after the containers are no longer detected by the first sensor.

According to the above aspect, by measuring the used amount of the containers stored in the storage section (131), it is possible to accurately recognize that the amount of the containers stored in the storage section (131) has decreased.

As illustrated in FIG. 13, in the sample analyzer (1), when production lot information (LI) on a container newly supplied to the storage section (131) is acquired after start of calculating the amount of the containers, the calculation unit (266) may reset the calculated amount of the containers.

According to the above aspect, the calculated amount is reset when the production lot information (LI) on the container newly supplied to the storage section (131) is acquired. Therefore, when the production lot information (LI) is newly acquired, the calculation of the amount can be restarted.

As illustrated in FIG. 13 and FIG. 14, the sample analyzer (1) may further include a reader (R) configured to read a code (C) attached to a container box (450) containing the containers, in which the production lot information acquisition unit (263) may acquire the production lot information (LI) included in the code (C) read by the reader (R).

According to the above aspect, the production lot information (LI) included in the code (C) is acquired by reading the code (C) attached to the container box (450) containing the containers. Thus, the production lot information (LI) can be acquired reliably and easily.

As illustrated in FIG. 15, in the sample analyzer (1), the production lot information (LI) may include at least a production lot number of the container.

As illustrated in FIG. 1, FIG. 4 to FIG. 10, FIG. 13, and FIG. 17, a sample analysis method according to a second aspect includes acquiring production lot information (LI) on a production lot of a container for containing a sample; analyzing the sample using the container discharged through a discharge port (150) provided to a storage section (131) configured to store the container; recording the production lot information (LI), an analysis result (RA) of the sample contained in the container, and time information related to time of analyzing the sample; and generating, based on the recorded information, display information for displaying at least one analysis result (RA) of at least one sample analyzed during a predetermined period of time on a display unit (300) in a manner that associates the at least one analysis result (RA) with the production lot information (LI).

According to the above aspect, the sample analysis method generates, based on the recorded information, display information for displaying at least one analysis result (RA) of at least one sample analyzed during a predetermined period of time on a display unit (300) in a manner that associates the at least one analysis result (RA) with the production lot information (LI). Thus, for example, the production lot information of the container associated with an analysis result indicating the occurrence of abnormality can be estimated. Therefore, the traceability of the containers that can accommodate the sample can be improved.

As illustrated in FIG. 13 and FIGS. 18A and 18B, in the sample analysis method, generating the display information may include generating the display information for displaying the production lot information (LI) on the display unit (300) in a predetermined display manner.

According to the above aspect, the display information for displaying the production lot information (LI) on the display unit (300) in a predetermined display manner is generated.

Therefore, the production lot information (LI) on the containers supplied to the storage section (131) can be easily recognized at a glance.

As illustrated in FIG. 13 and FIGS. 18A and 18B, in the sample analysis method, generating the display information may include generating first display information for displaying production lot information (LI) on the container already stored in the storage section (131) on the display unit (300); and when production lot information (LI) on a container newly supplied to the storage section (131) is acquired, second display information for displaying the production lot information (LI) on the display unit (300) may be generated.

According to the above aspect, the first display information is generated and then the second display information is generated. Therefore, the time when the production lot information is changed can be recognized with a certain level of accuracy.

As illustrated in FIG. 13 and FIGS. 18A and 18B, in the sample analysis method, generating the display information may include generating display information for displaying production lot information (LI) on a container newly supplied to the storage section (131) on the display unit (300), when a predetermined amount of containers already stored in the storage section (131) are discharged from the storage section (131) or a predetermined period of time elapses after the production lot information (LI) on the container newly supplied to the storage section (131) is acquired.

According to the above aspect, the display information is generated when certain conditions are satisfied as described above after the production lot information (LI) on the container newly supplied to the storage section is acquired. Thus, the time when the production lot information has been changed can be more accurately recognized.

As illustrated in FIG. 13 and FIG. 19, in the sample analysis method, generating the display information may include generating information for prompting supplying of the container when an amount of the containers stored in the storage section (131) decreases to or below a set amount.

According to the above aspect, for example, when the amount of the containers stored in the storage section (131) has decreased, the supplying of the container is prompted. Thus, the replenishing of containers can be prompted at an appropriate timing.

As illustrated in FIG. 4, FIG. 13, and FIG. 19, in the sample analysis method, generating the display information may include generating information for prompting supplying of the container based on a detection result of the container by a sensor (350) that is disposed at a predetermined height from a bottom part (131e) of the storage section (131).

According to the above aspect, for example, it is possible to easily recognize that the amount of the containers stored in the storage section (131) has decreased, whereby the replenishing of containers can be prompted at a more appropriate timing.

As illustrated in FIG. 8, FIG. 9, FIG. 13, and FIG. 19, in the sample analysis method, generating the display information may include generating information for prompting supplying of the container when it is determined that a predetermined amount or more of the containers are discharged through the discharge port (150), based on a detection result by a sensor (400) that is disposed at the discharge port (150).

According to the above aspect, for example, it is possible to easily recognize that the amount of the containers stored in the storage section (131) has decreased, whereby the replenishing of containers can be prompted at a more appropriate timing.

As illustrated in FIG. 4, FIG. 8, FIG. 9, and FIG. 13, the sample analysis method may further include calculating an amount of the containers discharged through the discharge port (150) as a used amount, based on a detection result by a first sensor that is disposed at the discharge port (150), in which calculating the amount of the containers may include calculating the amount of the containers discharged through the discharge port (150) as the used amount after the containers are no longer detected by a second sensor that is disposed at a predetermined height from a bottom part (131e) of the storage section (131).

According to the above aspect, by measuring the used amount of the containers stored in the storage section (131), it is possible to accurately recognize that the amount of the containers stored in the storage section (131) has decreased.

As illustrated in FIG. 13, in the sample analysis method, calculating the amount of the containers may include resetting the calculated amount of the containers, when production lot information (LI) on a container newly supplied to the storage section (131) is acquired after start of calculating the amount of the containers.

According to the above aspect, the calculated amount is reset when the production lot information (LI) on the container newly supplied to the storage section (131) is acquired. Therefore, when the production lot information (LI) is newly acquired, the calculation of the amount can be restarted.

As illustrated in FIG. 13 and FIG. 14, the sample analysis method may further include reading a code (C) attached to a container box (450) containing the containers, in which acquiring the production lot information (LI) may include acquiring the production lot information (LI) included in the read code (C).

According to the above aspect, the production lot information (LI) included in the code (C) is acquired by reading the code (C) attached to the container box (450) containing the containers. Thus, the production lot information (LI) can be acquired reliably and easily.

As illustrated in FIG. 15, in the sample analysis method, the production lot information (LI) may include at least a production lot number of the container.

According to the present invention, the traceability of a container that can store a sample can be increased.

BRIEF DESCRIPTION OF THE DRAWINGS

FIG. 5 is an explanatory diagram of an upper surface of the sample analyzer according to the first embodiment;

FIG. 15 is a diagram illustrating an example of an information table including analysis results and production lot information according to the first embodiment;

FIG. 17 is an explanatory diagram illustrating an example of a display screen of the display unit of the sample analyzer according to the first embodiment;

DETAILED DESCRIPTION OF THE PREFERRED EMBODIMENTS

Figure 1:
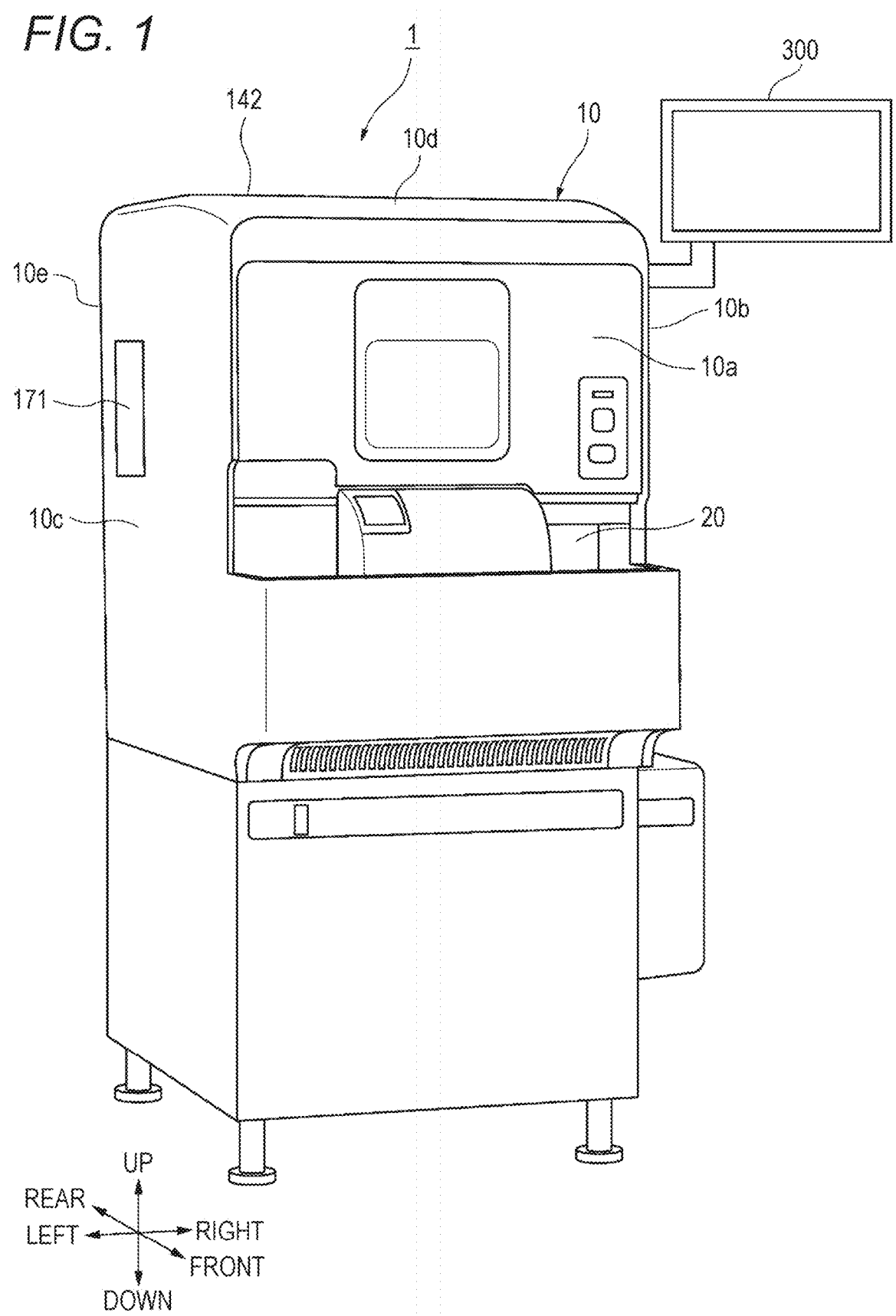
FIG. 1 is a perspective view illustrating an example of the configuration of a sample analyzer according to a first embodiment.

Hereinafter, a preferred embodiment will be described with reference to the drawings. The same reference numerals are given to the same elements, and redundant descriptions will be omitted. The positional relationship such as up, down, left and right is based on the positional relationship illustrated in the drawings unless otherwise specified. The dimensional ratios in the drawings are not limited to the illustrated ratios. The following embodiment is an example for explaining the present disclosure, and the present disclosure is not limited to this embodiment.

First Embodiment

<Configuration of Sample Analyzer>

Figure 2:
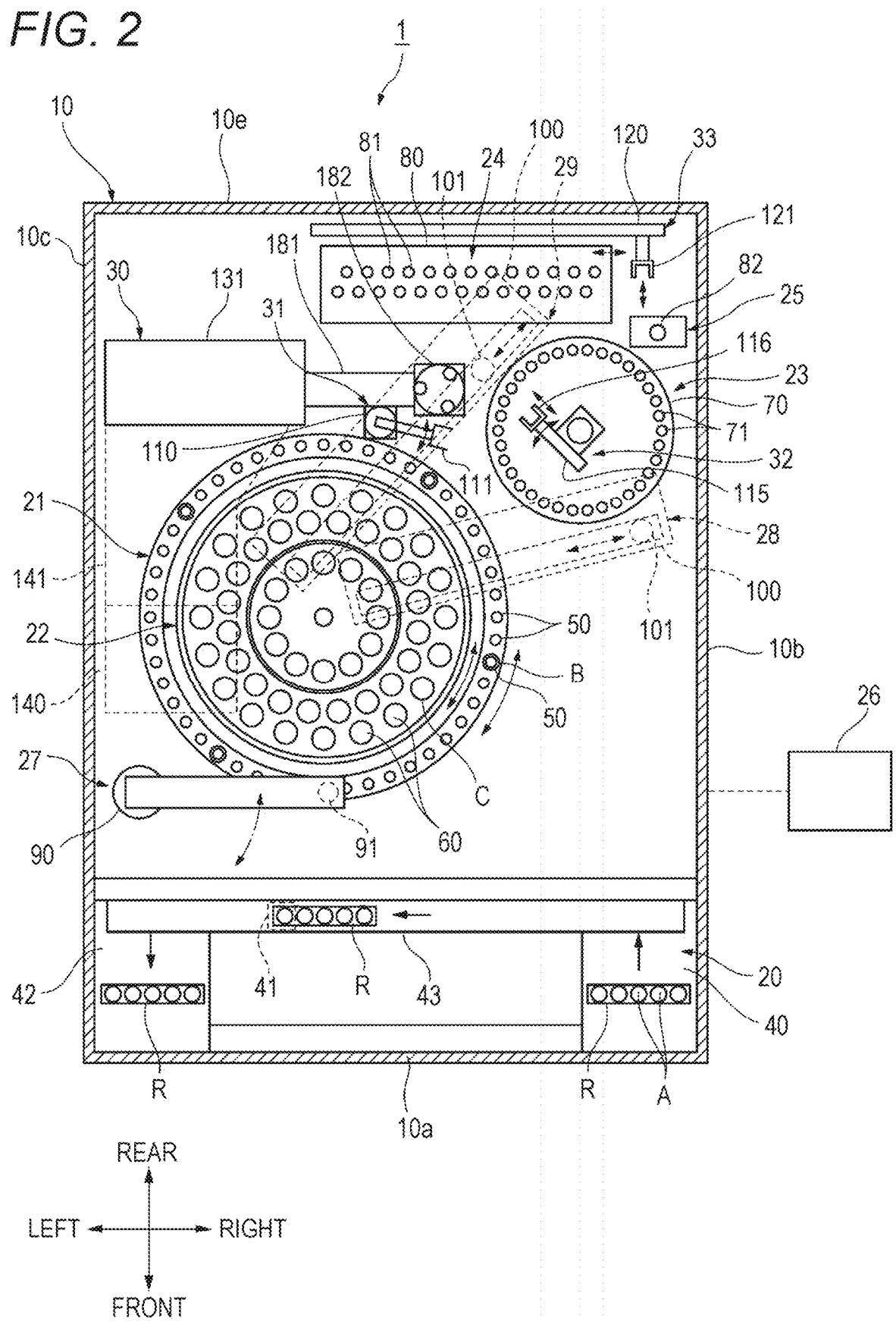
FIG. 2 is an explanatory diagram of a transverse section illustrating an outline of an internal configuration of the sample analyzer according to the first embodiment.

FIG. 1 is a perspective view illustrating an example of an outer appearance of a sample analyzer 1 according to a first embodiment. FIG. 2 is a schematic diagram illustrating an internal configuration of the analyzer 1.

The sample analyzer 1 automatically analyzes a sample such as blood. As illustrated in FIG. 1, the analyzer 1 includes a housing 10 having a substantially rectangular parallelepiped outer shape. The housing 10 includes, for example, a front wall 10a, a side wall 10b on the right side when viewed from the front surface (forward surface) side, a side wall 10c on the left side as viewed from the front side, a ceiling wall 10d, and a rear wall 10e.

As illustrated in FIG. 2, the sample analyzer 1 includes a sample container loading section 20 through which a sample container A is conveyed into the housing 10; a first table 21 on which a plurality of cuvettes B, serving as containers capable of accommodating samples, are held while being annularly arranged; a second table 22 on which a plurality of reagent containers C, containing reagent to be mixed into the sample, are held; a heater 23 that holds and heats the cuvettes B; an analysis unit 24 that holds the cuvette B and analyzes an analysis specimen (mixture of the sample and the reagent) of the cuvette B; and a discharge unit 25 that discharges the cuvette B on which the analysis has been completed; a controller 26; and the like.

The sample analyzer 1 further has an apparatus configuration for injecting liquid into the cuvette B. The configuration includes a sample dispensing arm 27 that injects the sample in the sample container A, loaded into the sample container loading section 20, into the cuvette B on the first table 21; two reagent dispensing arms 28 and 29 for dispensing the reagent in the reagent container C on the second table 22 into the cuvette B; and the like.

The sample analyzer 1 further has an apparatus configuration for conveying the cuvette B. The configuration includes a cuvette supply unit 30 that supplies the cuvette B into the apparatus main body; a first conveyance arm 31 that conveys the cuvette B supplied from the cuvette supply unit 30 to the first table 21; a second conveyance arm 32 that conveys the cuvette B on the first table 21 to the first reagent dispensing arm 28 or the heater 23; a third conveyance arm 33 that conveys the cuvette B in the heater 23 to the second reagent dispensing arm 29, the analysis unit 24, or the discharge unit 25; and the like.

In plan view, the sample container loading section 20 is disposed on the front side in the housing 10, and the first table 21 and the second table 22 are disposed around the center in the housing 10. The heater 23 is arranged on the right side in the housing 10, and the analysis unit 24 is arranged on the rear surface (back surface) side. The discharge unit 25 is disposed between the heater 23 and the analysis unit 24. The cuvette supply unit 30 is disposed on the left side in the housing 10 and between the analysis unit 24 and the first table 21.

The sample container loading unit 20 includes a rack loading section 40 into which a rack R containing a plurality of sample containers A is loaded; a sample suction position 41, accessible by the sample dispensing arm 27, at which the sample is sucked from the sample container A in the rack R by the sample dispensing arm 27; a rack unloading section 42 at which the rack R of the sample containers R from which the samples have been sucked out is unloaded; and a conveyance unit 43 that conveys the rack R from the rack loading section 40 to the sample suction position 41 and to the rack unlading section 42 in this order. The conveyance device 43 transfers the rack R using, for example, a conveyor.

The first table 21 has an annular shape and is configured to be rotatable by a driver. The first table 21 includes a plurality of cuvette holders 50 that hold the cuvette B. The cuvette holders 50 are arranged at equal intervals in a circumference direction, over the entire circumference.

Figure 3:
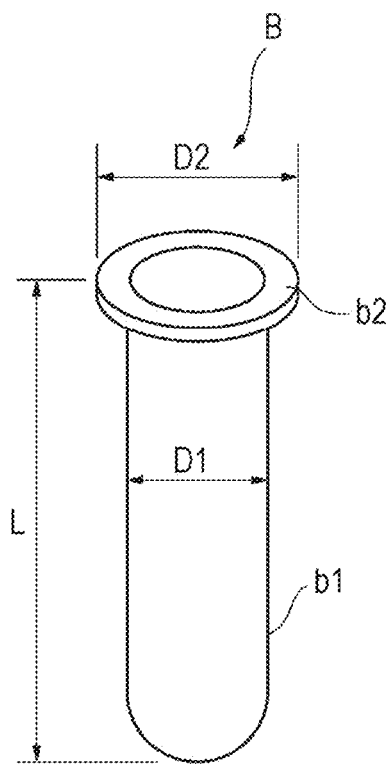
FIG. 3 is a perspective view illustrating an example of a cuvette according to the first embodiment.

As illustrated in FIG. 3, the cuvette B includes a body part b1 that stores liquid, and a flange part b2 provided near an inlet of the body part b1. The flange part b2 protrudes outward, in a radial direction, from the upper part of the body part b1, to have a larger outer diameter than the body part b1. The cuvette B has a dimension of, for example, about 30 mm in a longitudinal direction, has an outer diameter D1 of about 8 mm in the body part b1, and has an outer diameter D2 of about 10 mm in the flange part b2. The cuvette holder 50 illustrated in FIG. 2 has a hole that is larger than the outer diameter D1 of the body part b1 of the cuvette B and smaller than the outer diameter D2 of the flange part b2. The cuvette B can be held with the body part b1 of the cuvette B accommodated in the hole.

The second table 22 is disposed on the inner side of the first table 21. The second table 22 has a disk shape and is configured to be rotatable by a driver. The second table 22 includes a plurality of reagent container holders 60 that hold the reagent containers C. The reagent container holders 60 are arranged to form a plurality of concentric circles, for example. The reagent container holders 60 are arranged at an equal interval along the circumference direction, for example.

The heater 23 has a circular heating plate 70. The heating plate 70 has a plurality of cuvette holders 71 that hold the cuvettes B. For example, the cuvette holders 71 are arranged at an equal interval over the entire circumference of a portion near the outermost circumference of the heating plate 70. The heating plate 70 has a heat source, and can heat the liquid in the cuvette B held by the cuvette holder 71 to a predetermined temperature.

The analysis unit 24 has a rectangular analysis plate 80. The analysis plate 80 includes a plurality of cuvette holders 81 that hold the cuvettes B. A plurality of rows of the cuvette holders 81 are arranged along the longitudinal direction of the analysis plate 80, for example. The analysis unit 24 includes an irradiation unit and a light receiving unit. The irradiation unit irradiates the cuvette holder 81 with light. The light receiving unit receives light transmitted through analysis liquid in the cuvette B. Thus, the sample can be analyzed based on a result of the light reception, e.g., a measurement of characteristics of components in the sample is conducted to generate measurement data.

The discharge unit 25 includes a discharge hole 82 through which the cuvettes B are discharged. The discharge hole 82 is provided in a lower part of the housing 10 and communicates with a cuvette collection section in which the cuvettes are collected.

In plan view, the sample dispensing arm 27 is disposed between the sample suction position 41 of the sample container loading section 20 and the first table 21 in the housing 10. The sample dispensing arm 27 includes a driver 90 that drives the sample dispensing arm 27 and a nozzle 91 that sucks and ejects the sample.

For example, the driver 90 includes a rotation driver that rotates the sample dispensing arm 27, in a planer direction, between the sample suction position 41 and the first table 21; and a vertical driver that moves the sample dispensing arm 27 upward and downward. The nozzle 91 is provided at the tip of the sample dispensing arm 27, and can suck or eject the sample by means of a pump or the like. With this configuration, the sample dispensing arm 27 can access the sample container A at the sample suction position 41, suck the sample, move to be above the first table 21, and eject the sample into the cuvette B on the first table 21.

The reagent dispensing arms 28 and 29 each have elongated arms 100 in plan view, with a nozzle 101 provided in a lower part thereof. The arm 100 of the first reagent dispensing arm 28 extends from the second table 22 to the vicinity of the heater 23. The arm 100 of the second reagent dispensing arm 29 extends from the second table 22 to the vicinity of the analysis unit 24. The arms 100 are fixed to the ceiling of the housing 10, for example.

The nozzle 101 is configured to be able to be moved, by a driver, with respect to the arm 100 in the longitudinal direction thereof and in the vertical direction. The nozzle 101 of the first reagent dispensing arm 28 is movable along the arm 100 from a position above the second table 22 to a position above and in the vicinity of the heating table 70 of the heater 23. The nozzle 101 of the second reagent dispensing arm 29 is movable along the arm 100 from a position above the second table 22 to a position above and in the vicinity of the analysis plate 80 of the analysis unit 24. The nozzle 101 can suck or eject the reagent by means of a pump or the like (not illustrated). Furthermore, the nozzle 101 includes a heat source, and can heat the sucked reagent to a predetermined temperature. With this configuration, the nozzle 101 of the first reagent dispensing arm 28 can access the reagent container C of the second table 22, suck the reagent, move to above and the vicinity of the heating table 70, and eject the reagent into the cuvette B held by the second arm 32 in the vicinity of the heating table 70. Furthermore, the nozzle 101 of the second reagent dispensing arm 29 can access the reagent container C of the second table 22, suck the reagent, move to a portion above and in the vicinity of the analysis plate 80, and eject the reagent into the cuvette B held by the third arm 33 in the vicinity of the analysis plate 80.

The cuvette supply unit 30 stores an empty cuvette B input from the outside, and sequentially supplies the cuvettes B to a cuvette unloading section 182 described later. Details of the configuration of the cuvette supply unit 30 will be described later.

As illustrated in FIG. 2, the first arm 31 is disposed between a later-described conveyance path 181 of the cuvette supply unit 30 and the first table 21 in plan view. The first arm 31 includes a driver 110 that drives the first arm 31 and a cuvette holder 111 that holds the cuvette B. The driver 110 includes a rotation driver that rotates the first arm 31, in the planer direction, between the cuvette unloading section 182 of the cuvette supply unit 30 and the first table 21; and a vertical driver that moves the first arm 31 upward and downward. The cuvette holder 111 is provided at the tip of the first arm 31, has a U-shape for example, and can hold the cuvette B by hooking the flange part b2 of the cuvette B from below. With this configuration, the first arm 31 can hold the cuvette B in the cuvette unloading section 182 of the cuvette supply unit 30, move the cuvette B onto the first table 21, and place the cuvette B on the cuvette holder 50 on the first table 21.

For example, the second arm 32 is disposed on the heating plate 70 of the heater 23. The second arm 32 includes a driver 115 that drives the second arm 32 and a cuvette holder 116 that holds the cuvette B. For example, the driver 115 includes a rotation driver that rotates the second arm 32, in the planer direction, between the first table 21 and the heating table 70; a vertical driver that moves the second arm 32 upward and downward; and an expansion/contraction driver that makes the second arm 32 expand/contract in the horizontal direction. The cuvette holder 116 is provided at the tip of the second arm 32, has a U-shape for example, and can hold the cuvette B by hooking the flange part b2 of the cuvette B from below. With this configuration, the second arm 32 can hold the cuvette B held by the cuvette holder 50 on the first table 21, and move the cuvette B to be below the nozzle 101 of the first reagent dispenser 28 or to the cuvette holder 71 on the heating table 70.

The third arm 33 is disposed on the rear surface side of the analysis unit 24 in the housing 10 in plan view. The third arm 33 includes a driver 120 that drives the third arm 33 and a cuvette holder 121 that holds the cuvette B. The driver 120 includes a drive mechanism that moves the third arm 33 in a left-right direction, a front-back direction, and the vertical direction. The cuvette holder 121 is provided at the tip of the third arm 33, has a U-shape for example, and can hold the cuvette B by hooking the flange part b2 of the cuvette B from below. With this configuration, the third arm 33 can hold the cuvette B held by the cuvette holder 71 on the heating table 70, and move the cuvette B to be below the nozzle 101 of the second reagent dispenser 29 or to the cuvette holder 81 of the analysis unit 24. The third arm 33 can convey the cuvette B that has been analyzed to the discharge unit 25.

<Configuration of Cuvette Supply Unit>

Figure 4:
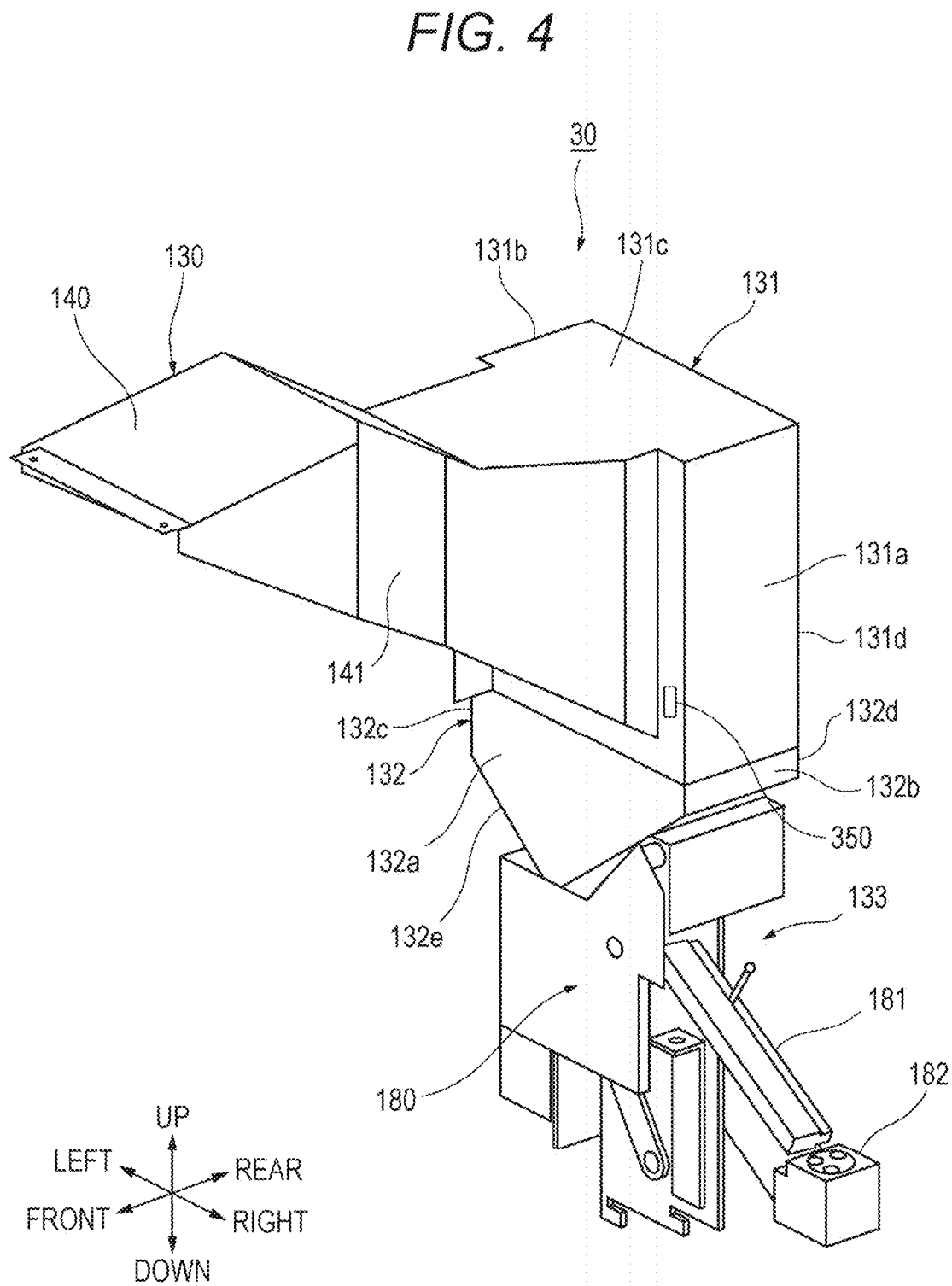
FIG. 4 is a perspective view illustrating an example of an appearance of a cuvette supply unit according to the first embodiment.

FIG. 4 is a perspective view schematically illustrating a configuration of the cuvette supply unit 30. For example, the cuvette supply unit 30 includes an input section 130 through which an empty cuvette B is input; a first storage section 131 (storage section) that stores the cuvette B input through the input section 130; a second storage section 132 that stores the cuvette B discharged from the first storage section 131; and a conveyance unit 133 that conveys the cuvette B in the second storage section 132.

Figure 6:
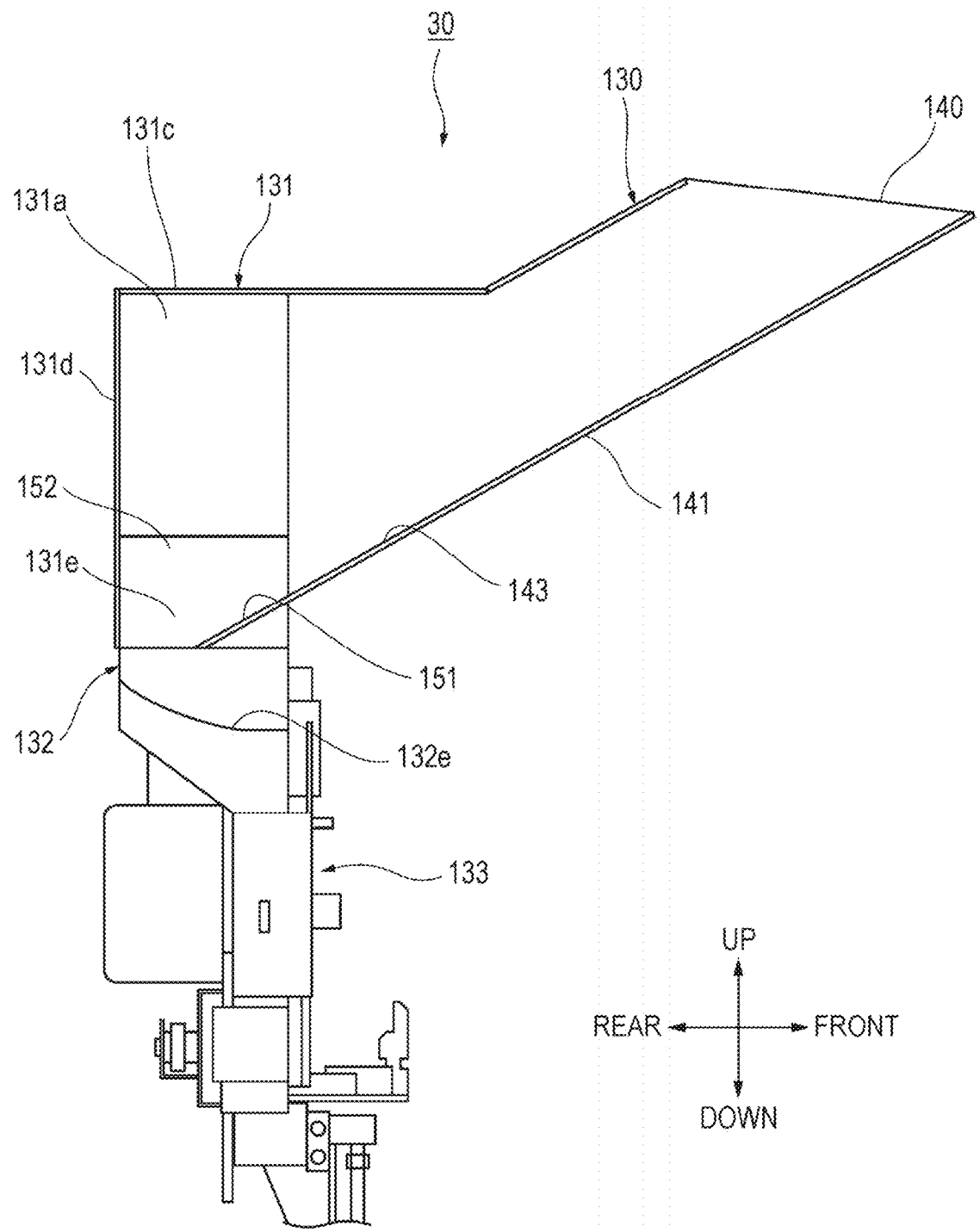
FIG. 6 is an explanatory diagram of a longitudinal section illustrating an example of an internal configuration of an input section of the cuvette supply unit according to the first embodiment.

The input section 130 includes, for example, a square input port 140 and a conveyance path 141 that extends from the input port 140 to the first storage section 131. As illustrated in FIG. 5, the input port 140 opens in the upper surface of the housing 10 when a door 142 provided on the ceiling wall 10d of the housing 10 is open. The conveyance path 141 extends in a direction from the front side toward the rear side of the housing 10. The conveyance path 141 has substantially square vertical cross section orthogonal to its extending direction. As illustrated in FIG. 6, the conveyance path 141 has a bottom surface 143 that is inclined so as to gradually descend from the input port 140 toward the first storage section 131.

Figure 7:
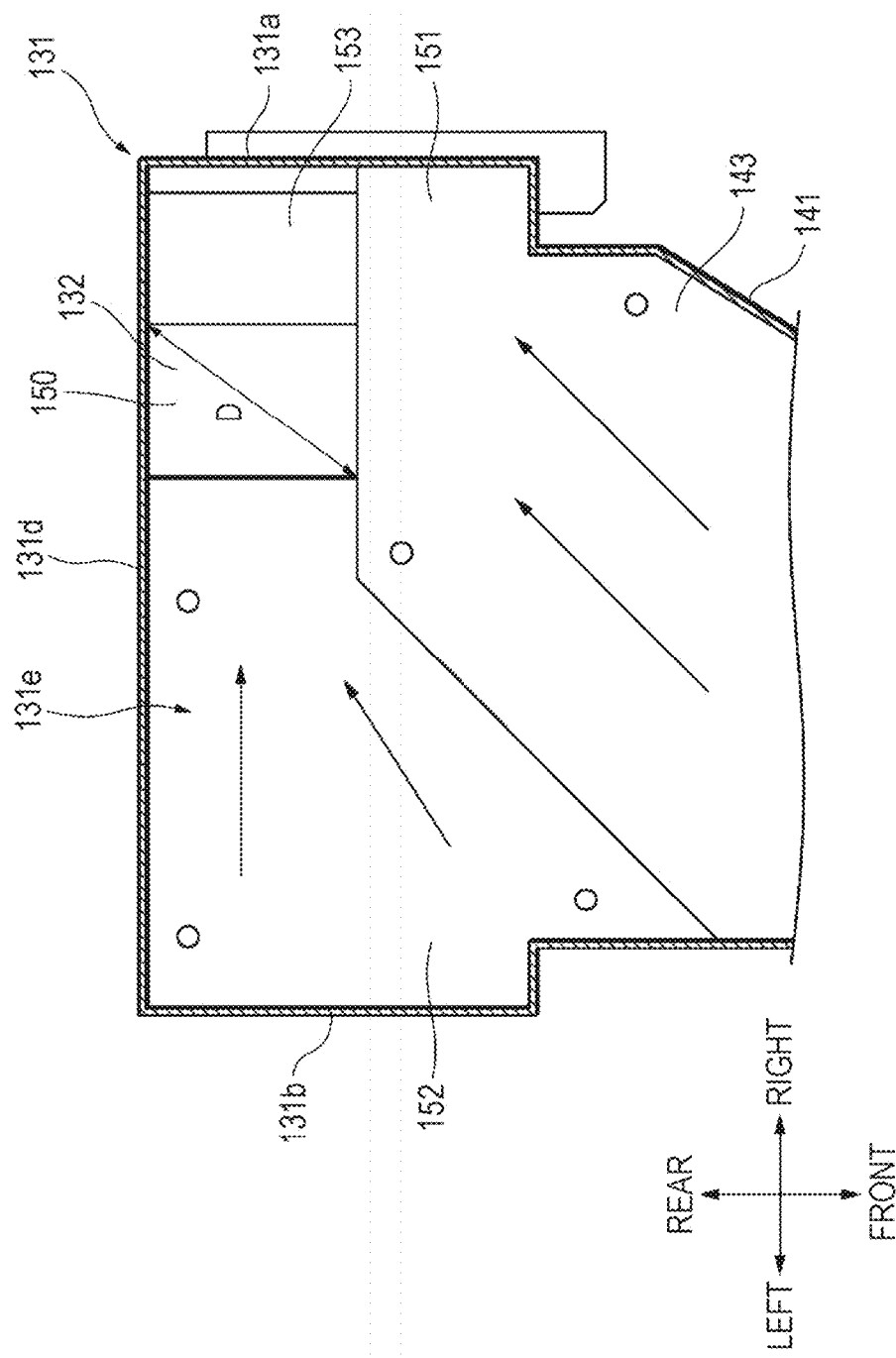
FIG. 7 is an explanatory diagram of a transverse cross section illustrating an example of an internal configuration of a first storage section of the cuvette supply unit according to the first embodiment.
Figure 8:
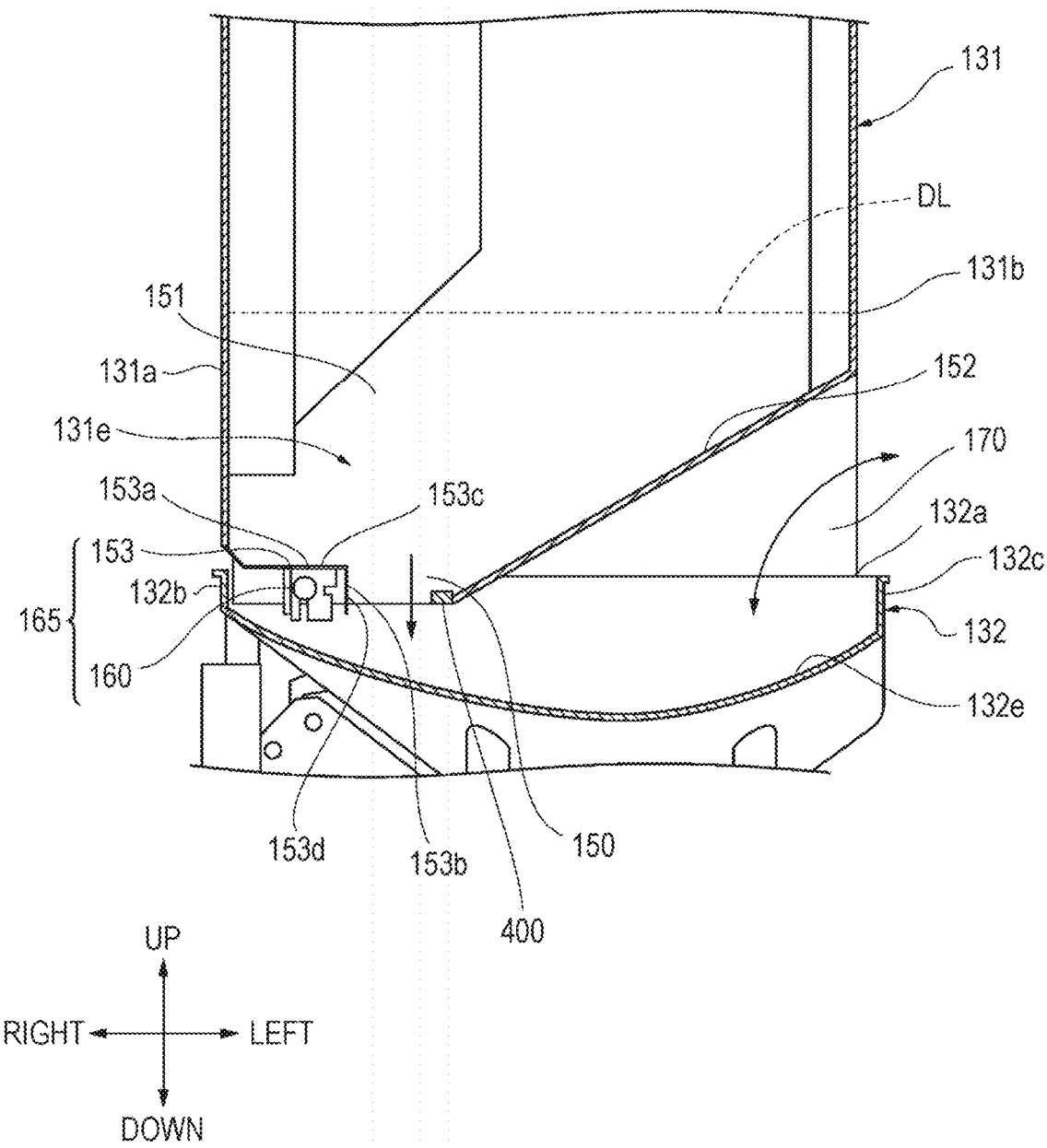
FIG. 8 is an explanatory diagram of a longitudinal section illustrating an example of an internal configuration of the first storage section and a second storage section viewed from a rear side according to the first embodiment.

As illustrated in FIG. 4, the first storage section 131 has a rectangular parallelepiped outer shape, and has a side wall 131a on the right side as viewed from the front side, a side wall 131b on the left side as viewed from the front side, a ceiling wall 131c, and a rear wall 131d, for example. The first storage section 131 has a front side open, and the conveyance path 141 is connected thereto. In addition, the first storage section 131 has a bottom part 131e illustrated in FIGS. 7 and 8. FIG. 7 is an explanatory diagram of a transverse section illustrating an internal configuration of the first storage section 131. FIG. 8 is an explanatory diagram of a longitudinal section illustrating internal configurations of the first storage section 131 and the second storage section 132 as viewed from the rear side of the housing 10.

As illustrated in FIG. 7, the bottom part 131e has a rectangular shape elongated in the left-right direction in plan view. The bottom part 131e includes, for example, a discharge port 150, a first inclined plate 151, a second inclined plate 152, and a diaphragm 153.

The discharge port 150 has a square shape, for example, and has a lower side open toward the second storage section 132. The discharge port 150 is adjacent to the rear wall 131d and is disposed at a position closer to the right side wall 131a than the center in the left-right direction is. The discharge port 150 has dimensions satisfying a relationship $L<D<3\times L$, and preferably satisfying $L<D<2\times L$, where L represents the maximum dimension of the cuvette B (the dimension in the longitudinal direction illustrated in FIG. 3) and D represents the maximum dimension of the discharge port (the diagonal dimension).

Figure 9:
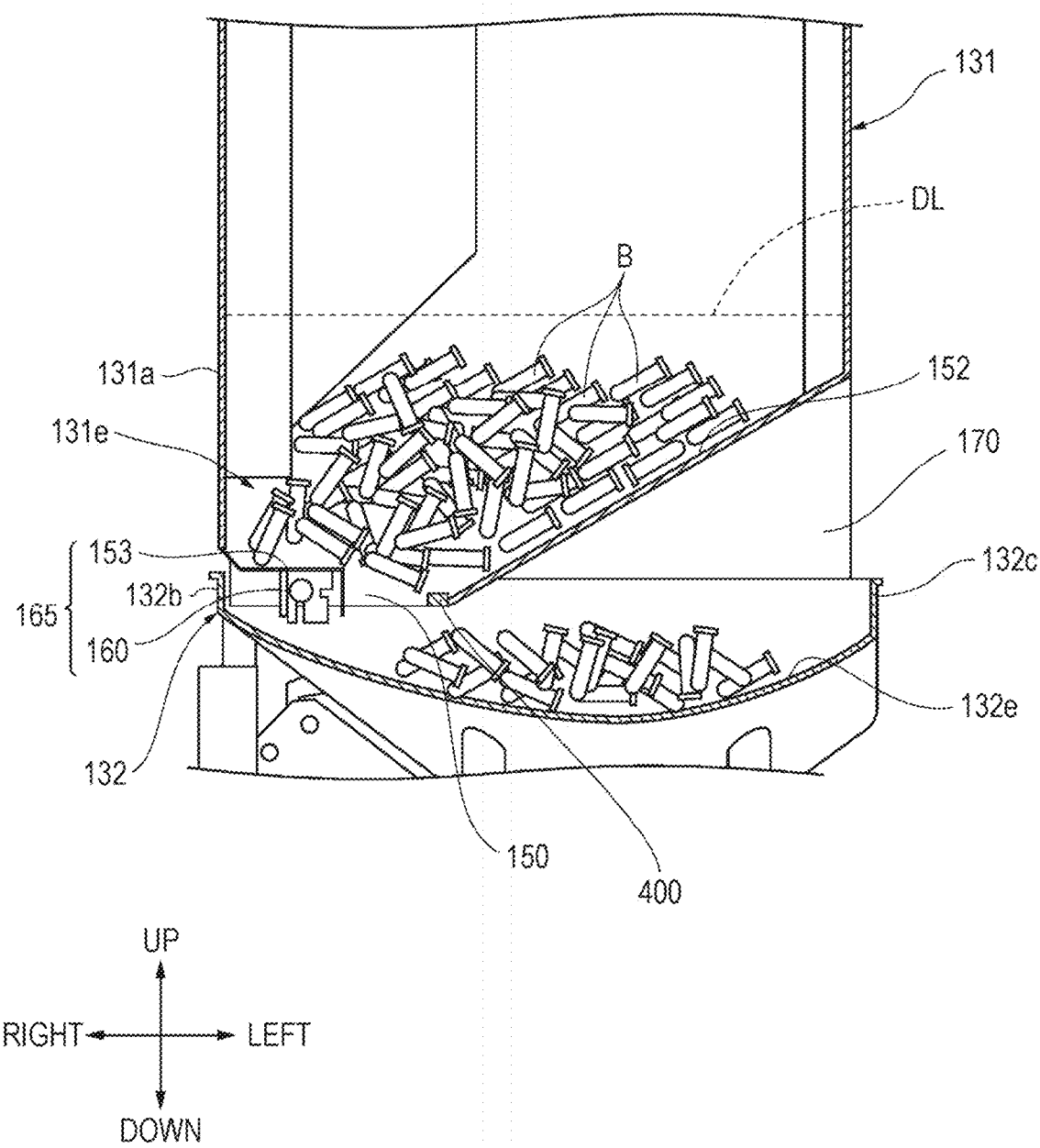
FIG. 9 is an explanatory diagram illustrating a state where cuvettes are stored in the first storage section and the second storage section according to the first embodiment.
Figure 10:
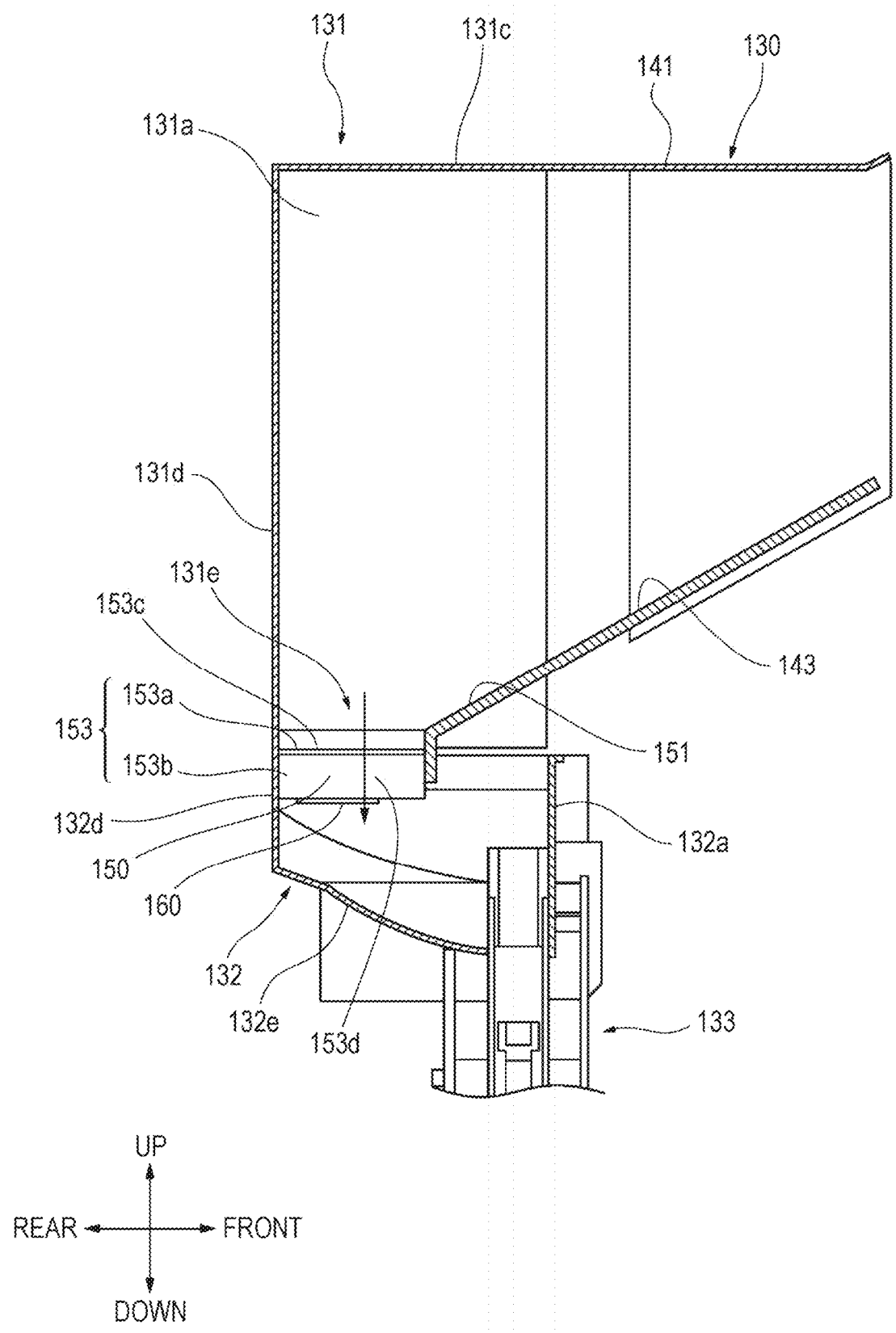
FIG. 10 is an explanatory diagram of a longitudinal section illustrating an example of the internal configuration of the first storage section and the second storage section viewed from a left side according to the first embodiment.

FIG. 10 is an explanatory diagram of a longitudinal section illustrating internal configurations of the first storage section 131 and the second storage section 132 as viewed from the left side of the housing 10. As illustrated in FIGS. 7 to 10, the first inclined plate 151 is provided on the front side of the first storage section 131, and is smoothly continues from the bottom surface 143 of the conveyance path 141. As illustrated in FIGS. 7 and 10, the first inclined plate 151 is inclined so as to gradually descend toward the discharge port 150 more on the right side than the center in the left-right direction.

As illustrated in FIGS. 7 and 8, the second inclined plate 152 is provided on the side of the left side wall 131b of the first storage section 131, and is inclined to gradually descend toward the discharge port 150 from the side wall 131b. For the first inclined plate 151 and the second inclined plate 152, a resin (for example, polyacetal) having a low frictional force is used, so that the cuvette B can smoothly slide thereon.

As illustrated in FIG. 7, the diaphragm 153 has a rectangular shape, for example, and forms a part of the bottom part 131e. The diaphragm 153 extends in a horizontal direction from the right side wall 131a toward the discharge port 150. The diaphragm 153 has a configuration to be more likely to vibrate than other surrounding parts. For example, the diaphragm 153 is configured to have a thin plate shape for example or is configured by a material having a high elastic modulus.

As illustrated in FIG. 8, the diaphragm 153 has, for example, an L-shape, and includes a horizontal part 153a extending from the right side wall 131a toward the discharge port 150; and a vertical part 153b extending downward from the tip of the horizontal part 153a. The vertical part 153b faces the discharge port 150 and forms a part of an edge of the discharge port 150. An upper surface 153c of the horizontal part 153a serves as an upper surface facing the inside of the first storage section 131, and an outer side surface 153d of the vertical part 153b serves as a side surface facing the discharge port 150. The upper surface 153c of the horizontal part 153a and the outer side surface 153d of the vertical part 153b are smoothly connected to each other at the upper edge in the edge of the discharge port 150.

FIG. 9 is an explanatory diagram of a state where cuvettes are stored in the first storage section and the second storage section, according to the first embodiment. As illustrated in FIGS. 8 and 9, a vibration member 160 that vibrates in the vertical direction is provided on the back surface of the diaphragm 153. The vibration member 160 is, for example, a vibration actuator that vibrates upon being supplied with power. The vibration of the vibration member 160 can be controlled by the controller 26. The diaphragm 153 is vibrated by the vibration member 160, so that the cuvettes B accumulated in the first storage section 131 can be dropped to the second storage section 132 through the discharge port 150. The remaining cuvettes B are retained due to the natural frictional force between the cuvettes B, to be stored in the first storage section 131. In this state, the second reservoir 132 stores an approximately fixed amount of cuvettes B not overwhelming the storage capacity of the second storage section 132. In the present embodiment, the diaphragm 153 and the vibration member 160 constitute a vibrator mechanism 165, which in turn forms a discharge controller that controls dropping of the cuvette B from the first storage section 131 to the second storage section 132.

Referring back to FIG. 4, the first storage section 131 further includes a storage section sensor 350 that is disposed at a predetermined height from the bottom part 131e of the first storage section 131, and can detect presence or absence of a cuvette stored in the first storage section 131. The storage section sensor 350 is also arranged at a specific position on the inner wall corresponding to the position of the outer wall of the first storage section 131. The storage section sensor 350 installed on the outer wall and the storage section sensor 350 installed on the inner wall can transmit and receive sensor information to and from each other. The storage section sensor 350 is, for example, a non-contact optical sensor, and detects the presence or absence of a cuvette by emitting a laser beam intermittently or periodically in a predetermined direction and receiving the reflected light. The reservoir sensor 350 is used to determine whether the amount of cuvettes stored in the first storage section 131 is equal to or less than a set amount (for example, 200). As illustrated in FIGS. 8 and 9, the storage section sensor 350, not illustrated in these figures, emits the laser beam in a direction indicated by a dotted line DL. For example, as illustrated in FIG. 9, when the cuvettes are stored below a virtual plane in the left-right direction including the broken line DL, the storage section sensor 350 detects no cuvette. Thus, the controller 26 that has acquired the sensor information from the storage section sensor 350 determines that the amount of the cuvette stored in the first storage section 131 is equal to or less than the set amount. The storage section sensor 350 may be a sensor other than an optical sensor such as a sensor employing other detection techniques, as long as the presence or absence of the cuvettes can be detected.

As illustrated in FIGS. 8 and 9, the first storage section 131 further includes a discharge port sensor 400 that is disposed at the discharge port 150 and can detect a discharge status of the cuvettes stored in the first storage section 131. The discharge port sensor 400 is, for example, a non-contact optical sensor, and detects whether a cuvette has passed through the discharge port 150 (has been discharged) by emitting a laser beam intermittently or periodically in a predetermined direction and receiving the reflected light. The discharge port sensor 400 may be a sensor other than an optical sensor such as a sensor employing other detection techniques, as long as whether the cuvette has passed through the discharge port 150 can be detected. The discharge port sensor 400 outputs sensor information corresponding to the detection result to the controller 26. The discharge port sensor 400 may be replaced with at least one of a first sensor 260 and a second sensor 261 described later. Specifically, a detection result from at least one of the first sensor 260 and the second sensor 261 may be used instead of the detection result from the discharge port sensor 400 for calculating the amount of cuvettes discharged through the discharge port 150 or the amount of cuvettes used. Furthermore, a detection result from at least one of the first sensor 260 and the second sensor 261 may be used in addition to the detection result from the discharge port sensor 400 for calculating the amount of cuvettes discharged through the discharge port 150 or the amount of cuvettes used.

Figure 11:
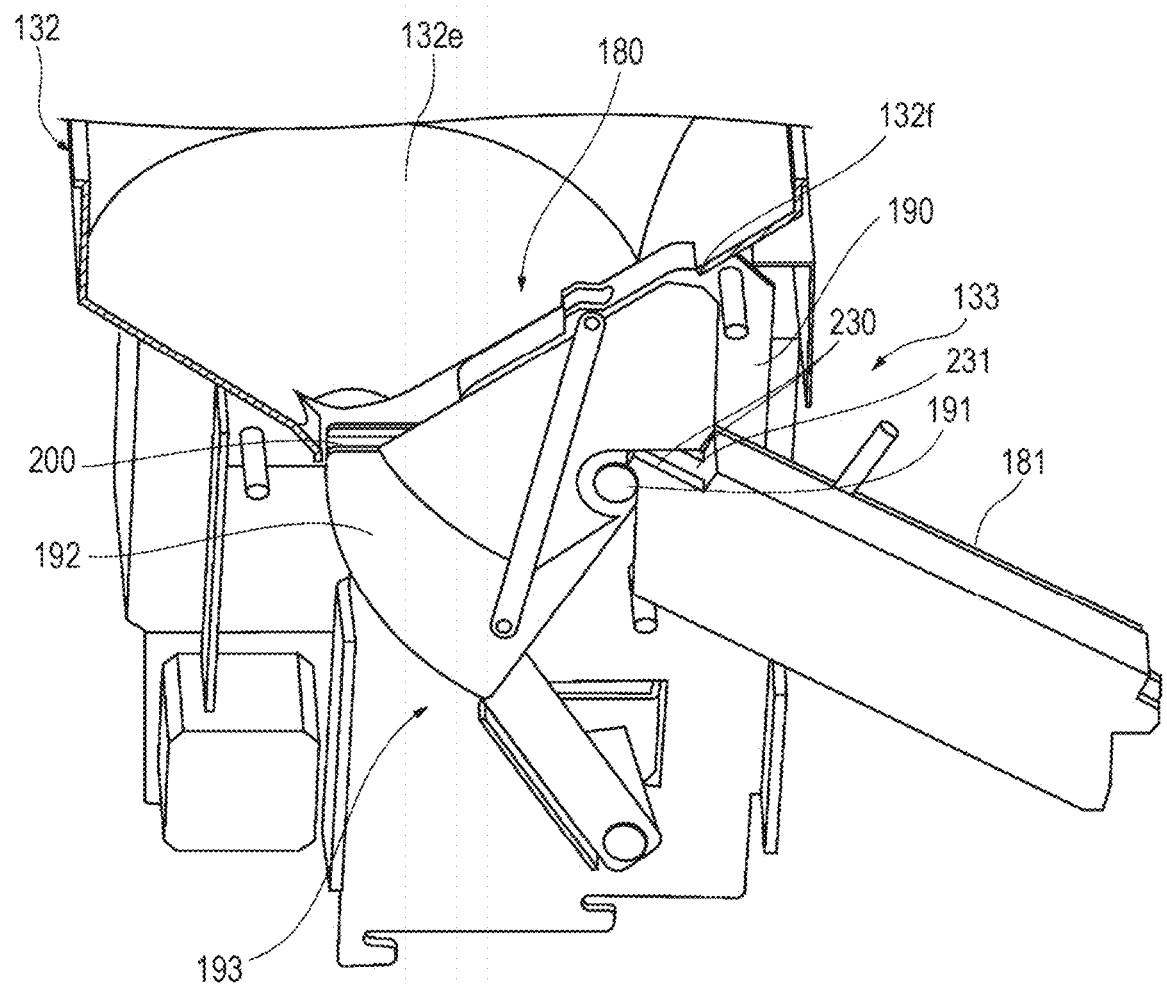
FIG. 11 is an explanatory diagram illustrating an example of an internal structure of the second storage section and a conveyance unit according to the first embodiment.

As illustrated in FIGS. 4, 8, and 11, the second storage section 132 is provided immediately below the first storage section 131. The second storage section 132 has a storage capacity smaller than that of the first storage section 131.

As illustrated in FIG. 4, the second storage section 132 has a front wall 132a, a side wall 132b on the right side as viewed from the front side, a side wall 132c on the left side as viewed from the front side, a rear wall 132d, and a bottom wall 132e.

As illustrated in FIG. 11, the bottom wall 132e has an inclined surface to be in an inverted conical shape (mortar shape) with the lowest point around the center.

The second storage section 132 has an upper surface provided with an opening to be exposed to the bottom part 131e of the first storage section 131. Thus, as illustrated in FIG. 8, a left side part of the upper surface of the second storage section 132 as viewed from the rear surface is exposed to the second inclined plate 152 of the bottom part 131e, and a gap 170 enabling the second storage section 132 to be accessed from the outside is formed immediately below the second inclined plate 152. As illustrated in FIG. 1, the left side wall 10c of the housing 10 corresponding to the gap 170 on the left side of the second storage section 132 is provided with a door 171 that can be opened and closed. When the door 171 is opened, the second storage section 132 can be accessed from the outside of the housing 10.

The conveyance unit 133 illustrated in FIG. 4 takes out the cuvettes B in the second storage section 132 and sequentially conveys the cuvettes B to the cuvette unloading section 182.

The conveyance unit 133 includes, for example, a take-out mechanism 180 that takes out the cuvettes B in the second storage section 132, a conveyance path 181 on which the cuvettes B taken out by the take-out mechanism 180 are conveyed, and a cuvette unloading section 182 that accommodates the cuvettes B conveyed on the conveyance path 181.

Figure 12:
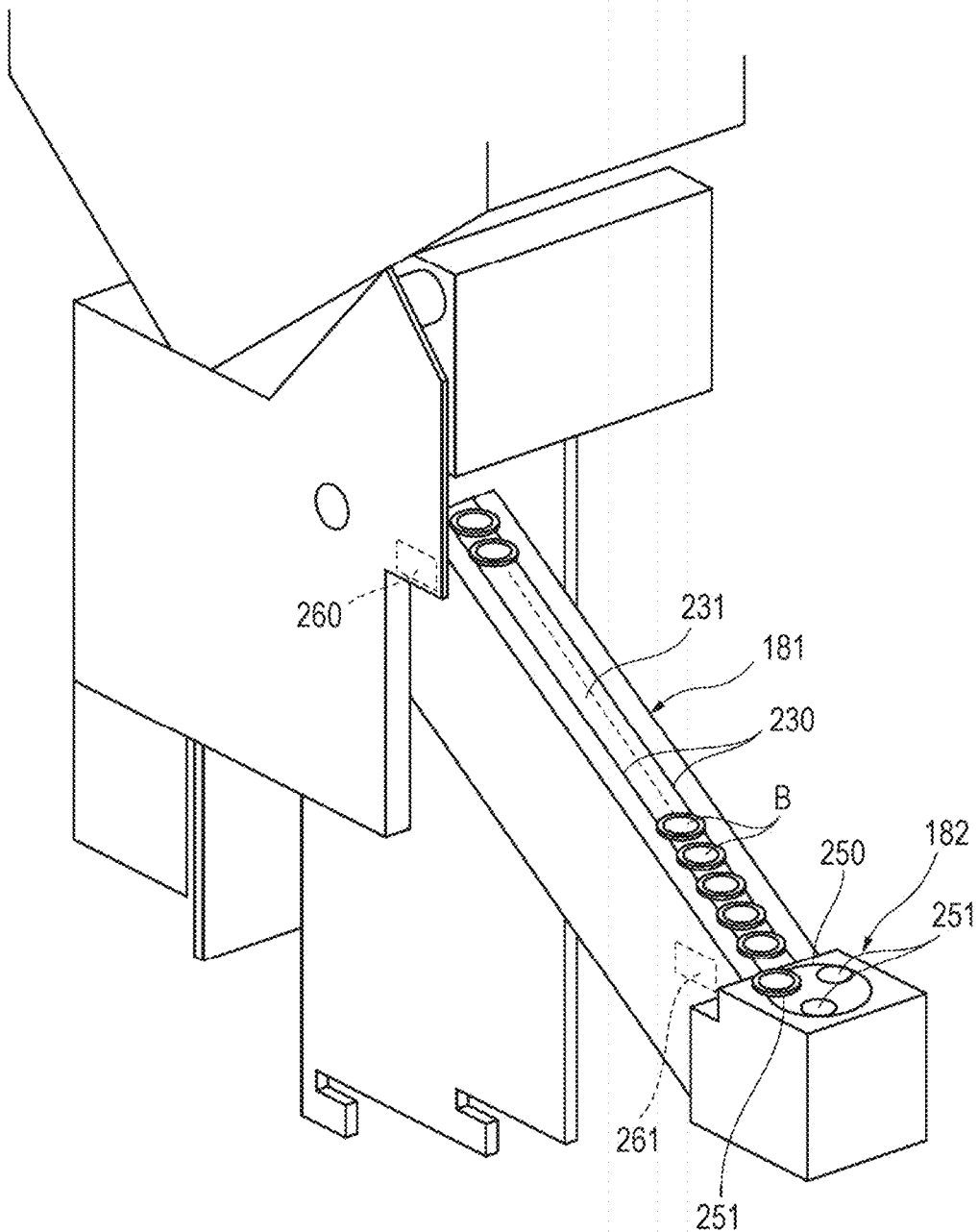
FIG. 12 is an explanatory diagram illustrating a configuration of a conveyance path according to the first embodiment.

As illustrated in FIG. 12, the cuvette unloading section 182 has a substantially rectangular parallelepiped outer shape. The cuvette conveyance unit 182 includes, for example, a rotating section 250 that is rotated by a driver. The rotating section 250 has a cylindrical shape and includes a plurality of (for example, three) receiving holes 251 on an outer circumference surface. The receiving holes 251 each have a substantially cylindrical shape to be capable of receiving the cuvette B from the outer circumference surface of the rotating section 250. The cuvette B dropped onto the conveyance path 181 is received to be held in the receiving hole 251 when the rotating section 250 rotates and the receiving hole 251 is aligned with a slit 231 of a rail 230. When the receiving hole 251 is not aligned with the slit 231 of the rail 230, the cuvette B stays on the rail 230. Under a normal condition, the amount of cuvettes B dropping onto the conveyance path 181 is set to be larger than the amount of cuvettes B held by the cuvette unloading section 182, so that a plurality of cuvettes B line up to the upper portion to the rail 230 of the conveyance path 181 (waiting in queue). A predetermined number (for example, 10) of cuvettes B can stay on the conveyance path 181. The predetermined number depends on the length of the path.

The cuvette supply unit 30 includes sensors capable of detecting a conveyance status of the cuvette B by the conveyance unit 133. Specifically, the conveyance path 181 includes the first sensor 260 that is provided at the uppermost part of the rail 230 and can detect the presence or absence of the cuvette B and whether the cuvettes B have passed and the second sensor 261 that is provided at the lowermost part of the rail 230 and can detect the presence or absence of the cuvette B. The first sensor 260 and the second sensor 261 are, for example, non-contact optical sensors each having a light irradiation unit and a light receiving unit, and each detects the presence or absence of the cuvette B and the like in accordance with whether the light receiving unit has received light emitted from the light emitting unit. The detection results from the first sensor 260 and the second sensor 261 are output to the controller 26.

The controller 26 is, for example, a computer in which a CPU can executes a program stored in a memory of the computer to control driving of various drivers (for the sample injection arm 27, the reagent dispenser 28, 29, the first arm 31, the second arm 32, the third arm 33, the sample container loading section 20, the first table 21, the second table 22, the heater 23, the analysis unit 24, the cuvette supply unit 30, and the like) for implementing the sample analysis processing. In particular, in the analysis processing, the controller 26 can control the operation of the vibrator mechanism 165 based on the detection result related to the conveyance status of the cuvette B obtained by the sensors 260 and 261.

Figure 13:
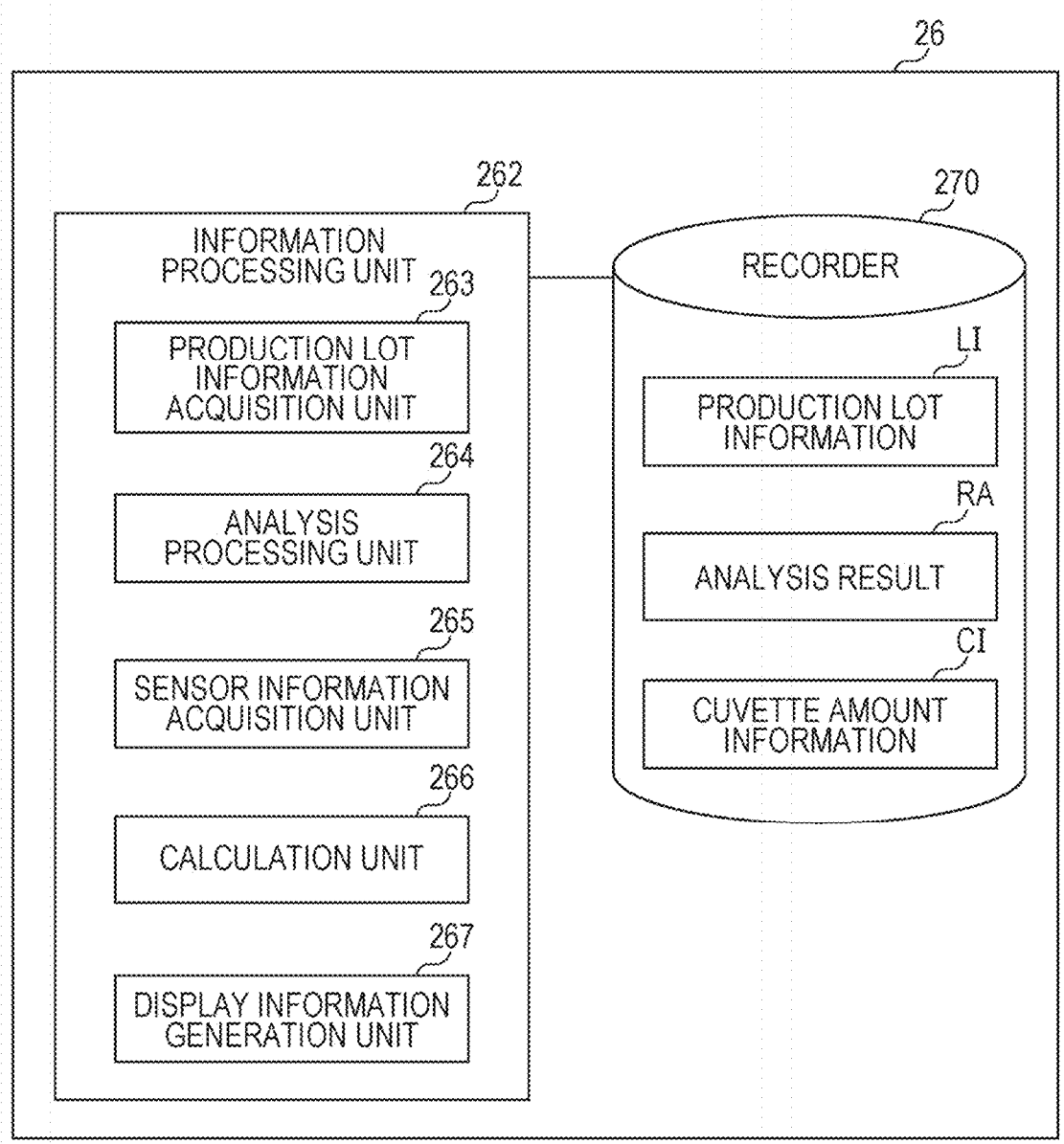
FIG. 13 is a diagram illustrating an example of a block configuration of a controller according to the first embodiment.

FIG. 13 is a diagram illustrating an example of a block configuration of the controller 26 according to the first embodiment. As in an example illustrated in FIG. 13, the controller 26 includes an information processing unit 262 that executes information processing for generating display information to be displayed on a display unit 300 illustrated in FIG. 1 and a recorder 270 that records information related to the information processing.

The information processing unit 262 includes functions including a production lot information acquisition unit 263, an analysis processing unit 264, a sensor information acquisition unit 265, a calculation unit 266, and a display information generation unit 267. Each of these function is executed with the CPU executing a program stored in the memory of the controller 26 (computer).

The production lot information acquisition unit 263 acquires production lot information (for example, a production lot number) on a production lot of a cuvette.

Figure 14:
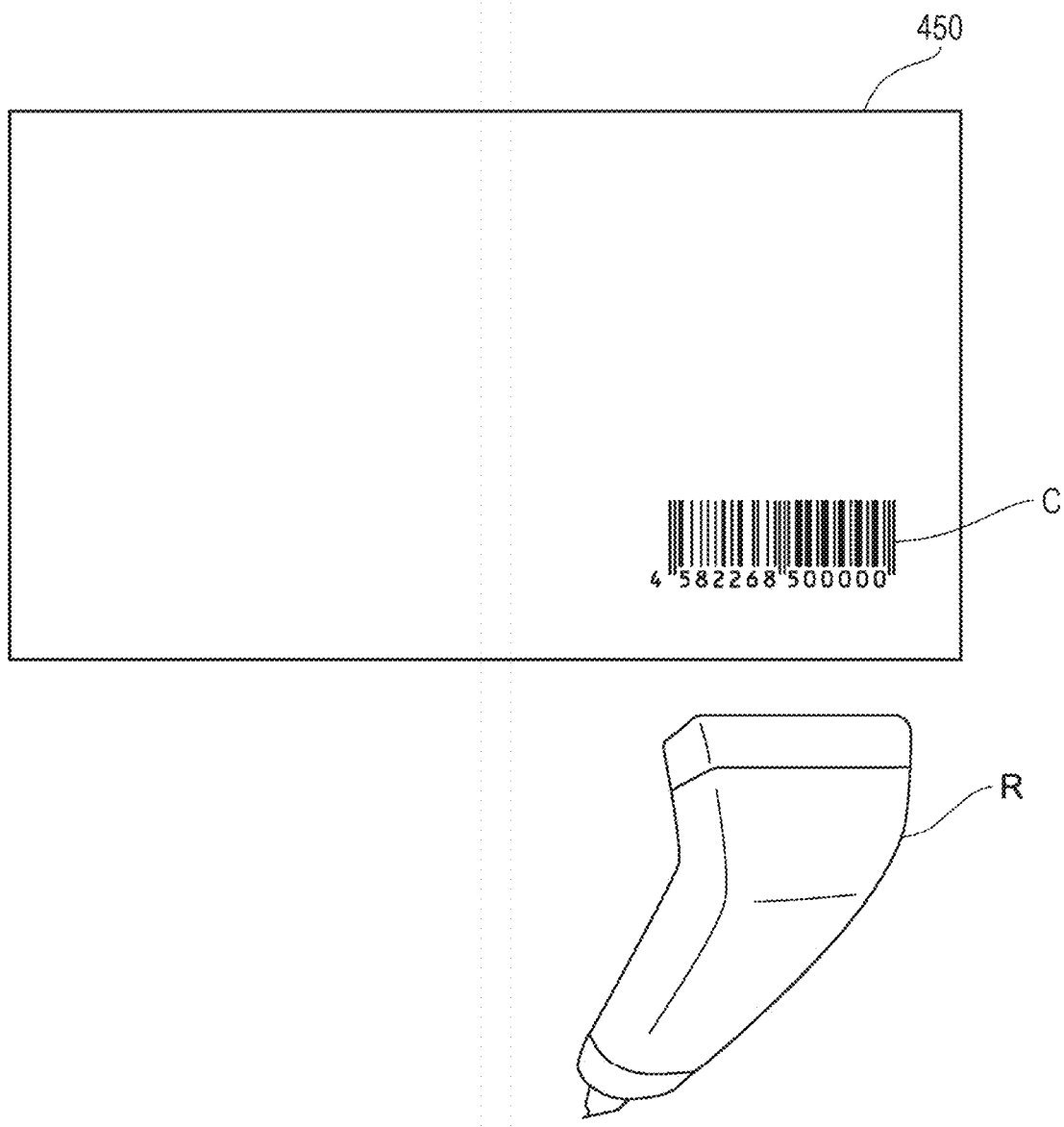
FIG. 14 is an explanatory diagram illustrating an example of processing executed by a reader according to the first embodiment for reading a code attached to a container box in which cuvettes are stored.

FIG. 14 is an explanatory diagram of an example of processing of reading a code attached to a container box containing the cuvettes, executed by a reader according to the first embodiment. As illustrated in FIG. 14, a reader R of the sample analyzer 1 illustrated in FIG. 1 reads a code C attached to the container box 450 containing the cuvette. The reader R outputs barcode information to the controller 26. The code may include a one dimensional code (barcode), and may also include a two dimensional code (QR code (registered trademark)) or any other codes. Then, the production lot information acquisition unit 263 acquires production lot information LI included in the code C read by the reader R. The production lot information LI may further include the number of cuvettes contained in the container box 450, that is, the number of cuvettes newly supplied to the first storage section 131, together with the production lot number.

According to this configuration, the production lot information LI included in the code C is acquired by reading the code C attached to the container box 450 containing the cuvette. Thus, the production lot information LI can be acquired reliably and easily.

The container box 450 has, for example, three bags each including 1000 cuvettes. Thus, one container box includes 3000 cuvettes. Therefore, the production lot information LI includes unique production lot information allocated to each set of 3000 cuvettes. A container bag may be used instead of the container box 450.

Referring back to FIG. 13, the analysis processing unit 264 performs analysis processing of the sample stored in the cuvette discharged from the discharge port 150 illustrated in FIGS. 8 to 10. For example, the analysis processing unit 264 analyzes an analysis specimen (mixture of the sample and reagent) stored in the cuvette, e.g., the analysis processing unit 264 performs analysis processing of measurement data generated from the analysis unit 24.

The sensor information acquisition unit 265 acquires sensor information that is the detection results from the storage section sensor 350 illustrated in FIG. 4 and the discharge port sensor 400 illustrated in FIGS. 8 and 9, as well as the first sensor 260 and the second sensor 261 illustrated in FIG. 12.

The calculation unit 266 calculates the amount of cuvettes discharged from the discharge port 150 as the used amount based on the detection results from the discharge port sensor 400 illustrated in FIGS. 8 and 9. For example, the calculation unit 266 can accurately calculate the amount of cuvettes used in the analysis processing by measuring the number of cuvettes passing through the discharge port 150.

The display information generation unit 267 generates display information with which an analysis result of one or a plurality of samples analyzed during a predetermined period of time is displayed on the display unit 300 in a manner that associates the result with the production lot information, based on the production lot information LI, the analysis result, and time information indicating time when the analysis processing is executed. The display information generation unit 267 outputs the generated display information to the display unit 300.

The "predetermined period of time" may be several hours, one day (24 hours), or a plurality of days, or may be in units of weeks, months, or years. The "time information" indicates the time when the analysis processing is executed, and includes, for example, the analysis start time or the analysis end time, as illustrated in FIG. 15. The time information may be a specific time point during the analysis processing.

The recorder 270 records at least the production lot information LI, an analysis result RA of the sample stored in the cuvette, and cuvette amount information CI in association with each other. The time information indicating the time at which the sample is analyzed may be included in the analysis result RA, or may be recorded separately from the analysis result RA. The cuvette amount information CI is information on the cuvette amount, and may indicate the number of cuvettes newly supplied to the first storage section 131, for example. Furthermore, the cuvette amount information CI may be the used amount of cuvettes (for example, the number of cuvettes used), based on the sensor information output from the discharge port sensor 400 illustrated in FIGS. 8 and 9 and on the sensor information output from the first sensor 260 and the second sensor 261 illustrated in FIG. 12.

FIG. 15 is a diagram illustrating an example of an information table including analysis results and production lot information according to the first embodiment. As illustrated in FIG. 15, for example, the recorder 270 records the sample number, the production lot number, the analysis time, and the analysis result in association with each other. The recorder 270 may further record rack information such as a rack number and a rack position for each sample number.

<Display Information Generation Processing>

Figure 16:
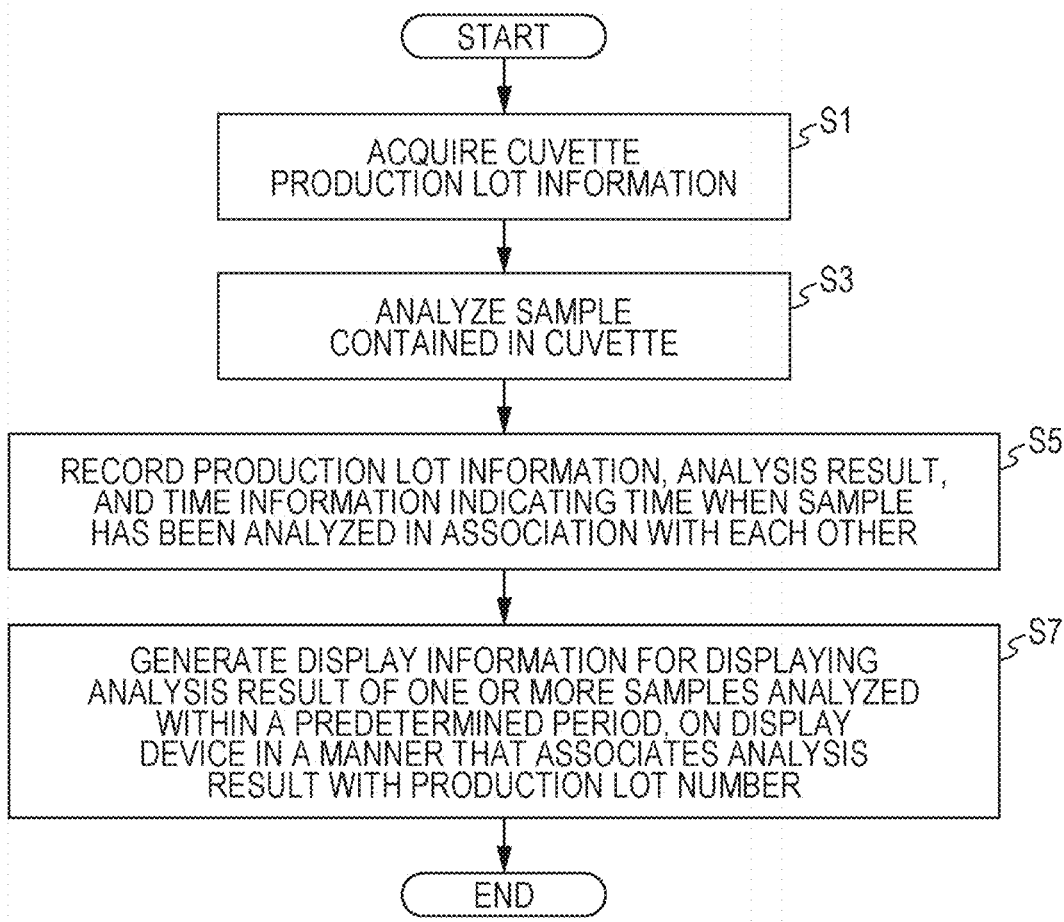
FIG. 16 is a flowchart illustrating an example of display information generation processing according to the first embodiment.

An example of display information generation processing according to the first embodiment will be described with reference to FIGS. 16 and 17. FIG. 16 is a flowchart illustrating an example of the display information generation processing according to the first embodiment.

As illustrated in FIG. 16, the production lot information acquisition unit 263 illustrated in FIG. 13 acquires the production lot information LI on a plurality of cuvettes that can store samples (step S1). The analysis processing unit 264 analyzes the sample stored in the cuvette discharged from the discharge port 150 provided to the first storage section 131 capable of storing the cuvettes (step S3). The recorder 270 records the production lot information LI, the analysis result RA of the sample stored in the cuvette, and the time information indicating the time when the sample is analyzed in association with each other (step S5). The display information generation unit 267 generates display information with which an analysis result RA of samples analyzed during a predetermined period of time (a day, for example) is displayed on the display unit 300 in a manner that associates the analysis result with the production lot information, based on the production lot information LI, the analysis result RA, and the time information (step S7).

FIG. 17 is an explanatory diagram illustrating an example of an analysis result screen G1 of the display unit 300 of the sample analyzer 1. As illustrated in FIG. 17, for example, the display information generation unit 267 displays the display information for displaying the analysis results RA dated Jan. 13, 2019 on the display unit 300 in a manner in which the results are listed while being associated with the production lot numbers. The analysis result screen G1 may further include rack information such as a rack number and a rack position for each sample number.

The analysis result of a sample number "20_27" is "Error" (abnormality occurred). Whether an abnormality has occurred in a certain analysis result is determined as follows. Specifically, a first reference value for an analysis value and a second reference value lower than the first reference value are set for each analysis processing, and it is determined that an abnormality has occurred in the analysis processing when a certain analysis value exceeds the first reference value or falls below the second reference value, for example. Then, the user operating the sample analyzer 1 can recognize that the production lot number of the cuvette containing the sample of the analysis result in which an abnormality has occurred is "U1000-011".

As described above, the cuvette replenishing is performed when the number of cuvettes stored in the first storage section 131 becomes small. For example, when the remaining number of stored cuvettes decreases to about 100, 1000 new cuvettes are supplied to the first storage section 131. When new cuvettes are thus supplied before the cuvettes stored in the first storage section 131 are fully consumed, cuvettes with different production lot numbers may coexist in the first storage section 131. Therefore, although the production lot number of the cuvette containing the sample of the analysis result of which indicates that an abnormality has occurred is displayed as "U1000-011" on the analysis result screen G1 illustrated in FIG. 17, the production lot number of the cuvette containing the sample of the analysis result of which indicates that an abnormality has occurred may not be "U1000-011" and may be "A1000-001". Thus, the production lot number of the cuvette containing the sample of the analysis result of which indicates that an abnormality has occurred may not be perfectly traceable. Still, the user can determine (anticipate) that the production lot number of such a cuvette is likely to be any one of "U1000-011" and "A1000-001" associated with a plurality of analysis results within a predetermined period of time.

According to the first embodiment described above, the display information is generated with which an analysis result of samples analyzed during a predetermined period of time is displayed on the display unit 300 in a manner that associates the analysis result RA with the production lot information LI, based on the production lot information LI, the analysis result RA, and the time information. Thus, the production lot information of the cuvette associated with an analysis result indicating the occurrence of abnormality can be estimated. Therefore, the traceability of the cuvette that can accommodate the sample can be improved.

The analysis result screen G1 is a screen displaying a list of analysis results for Jan. 13, 2019, that is, a single day, but is not limited thereto. For example, the analysis result screen G1 may be a screen displaying a list of analysis results for several hours or a plurality of days, or may be a screen displaying a list of analysis results in units of weeks, months, or years.

On the analysis result screen G1, the analysis result indicating the occurrence of abnormality may be displayed in a display manner different from that for other analysis results. For example, the analysis result of the sample number "20_27" may be displayed in a color different from that used for the other analysis results, or may be highlighted, that is, may be displayed with letters having thickness different from those of the other analysis results or in the other manner. With this configuration, an analysis result indicating an occurrence of abnormality can be easily recognized on the analysis result screen G1.

Second Embodiment

Figure 18A:
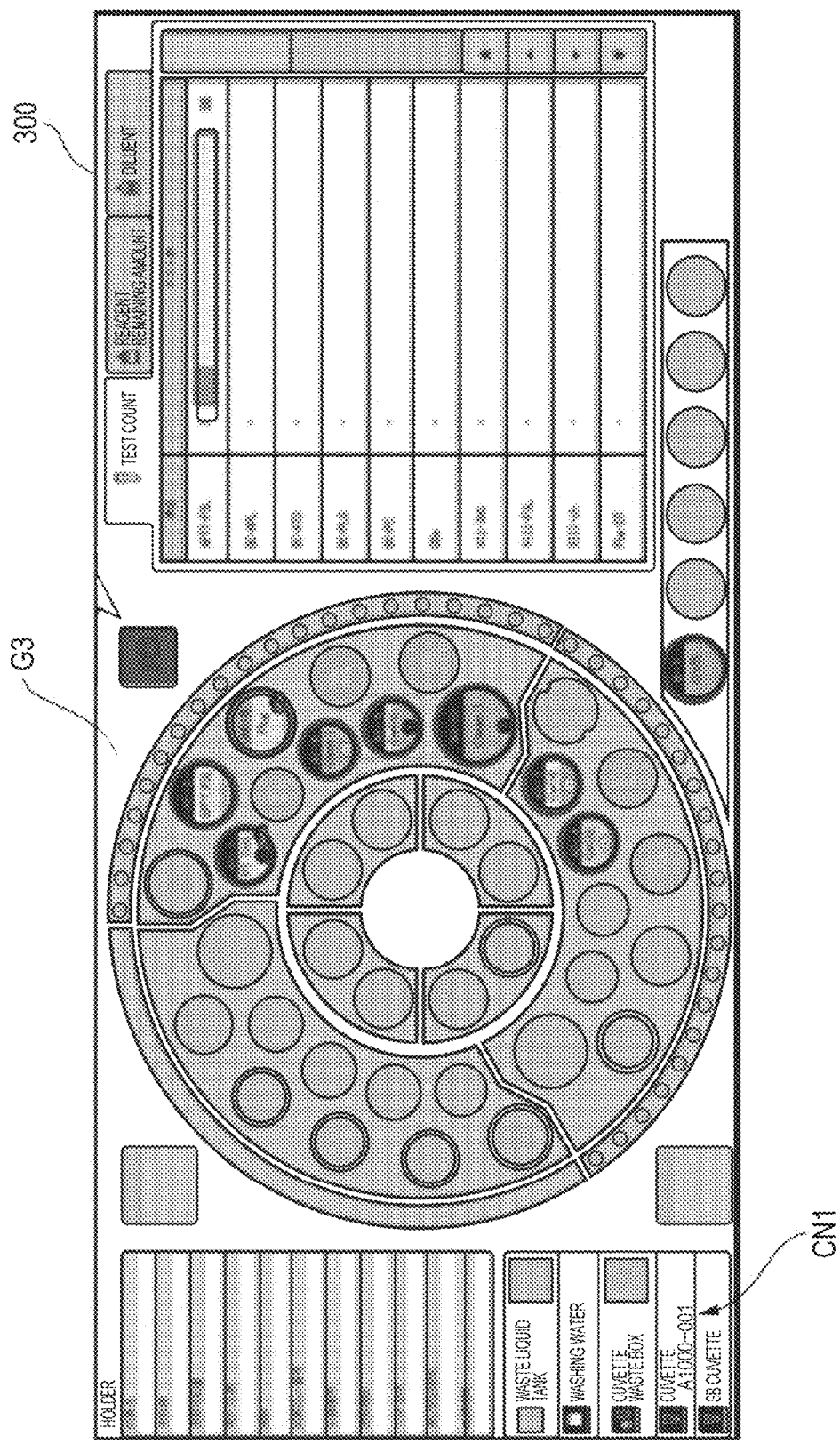
FIG. 18A is an explanatory diagram illustrating an example of a display screen of a display unit of a sample analyzer according to a second embodiment.
Figure 18B:
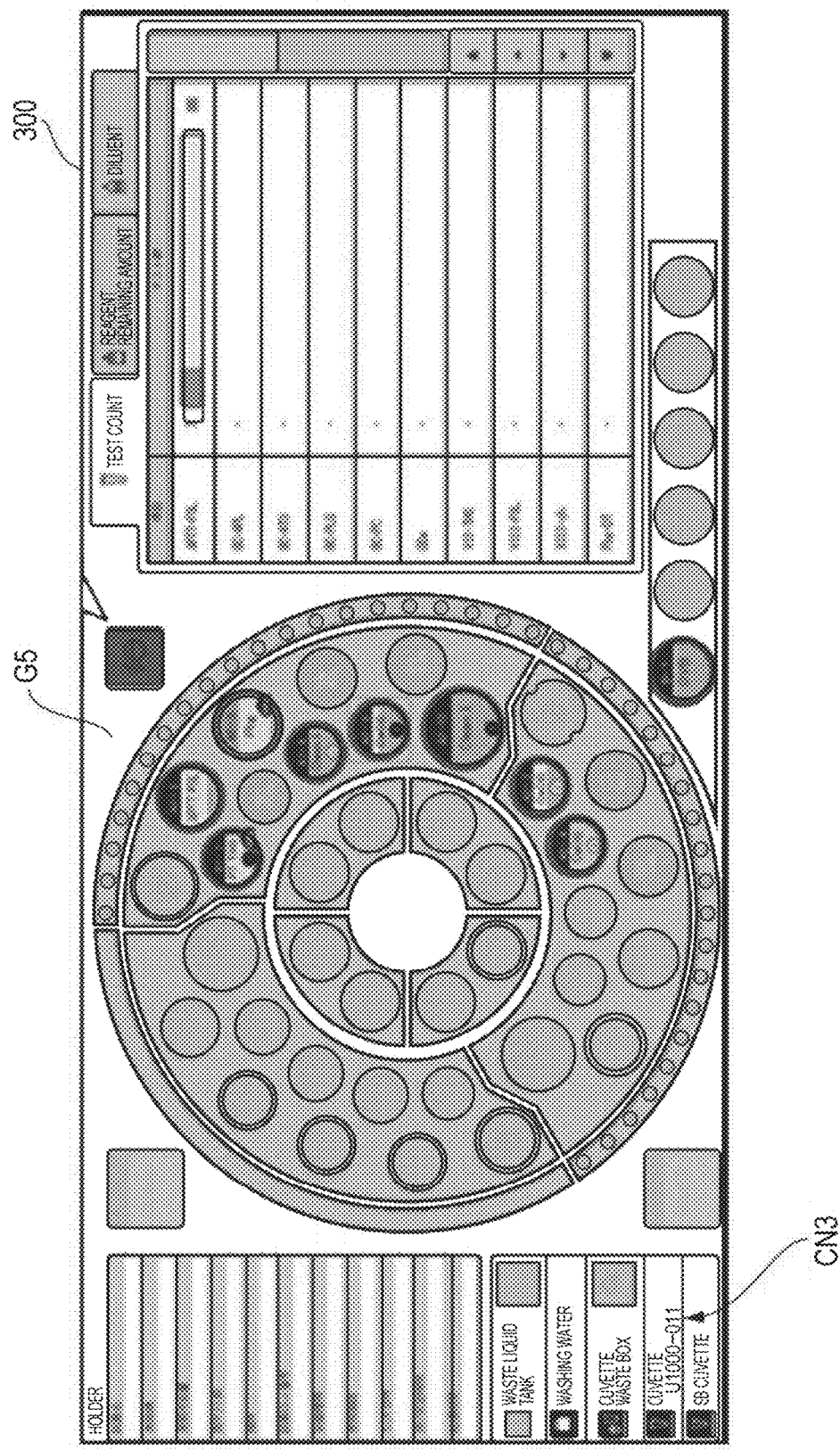
FIG. 18B is an explanatory diagram illustrating an example of a display screen of a display unit of a sample analyzer according to a second embodiment.

An example of display information generation processing according to a second embodiment will be described with reference to FIGS. 18A and 18B. FIGS. 18A and 18B are each an explanatory diagram illustrating an example of cuvette management screens of the display unit 300 of the sample analyzer 1. As illustrated in FIGS. 18A and 18B, the cuvette management screens G3 and G5 include, for example, an image corresponding to the internal configuration of the sample analyzer 1 illustrated in FIG. 2, to enable real-time recognition of the management status of a cuvette. FIG. 18A illustrates an example of a cuvette management screen including the production lot number of cuvettes stored in advance in the first storage section 131 illustrated in FIGS. 4 to 10 and the like. FIG. 18B is an example of a cuvette management screen including the production lot number of the cuvettes newly supplied to the first storage section 131.

As illustrated in FIG. 18A, when the production lot information acquisition unit 263 acquires the production lot information LI of cuvettes supplied to the first storage section 131, the display information generation unit 267 illustrated in FIG. 13 generates display information for displaying the production lot information LI on the display unit 300 in a predetermined display manner. Then, the display unit 300 displays the cuvette management screen G3 including a production lot number CN1 "A1000-001".

With this configuration, the production lot information LI on the cuvettes supplied to the first storage section 131 can be easily recognized at a glance.

As illustrated in FIG. 18A, the display information generation unit 267 generates first display information for displaying, on the display unit 300, the production lot information LI on the cuvettes stored in the first storage section 131 (illustrated in FIGS. 4 to 10 and the like) in advance. Then, the display unit 300 displays the cuvette management screen G3 including the production lot number CN1 "A1000-001", for example. Thereafter, when the production lot information acquisition unit 263 acquires the production lot information LI on cuvettes supplied to the first storage section 131 (information corresponding to the production lot number CN3 "U1000-011"), the display information generation unit 267 generates second display information for displaying the production lot information LI on the display unit 300, for example. For example, as illustrated in FIG. 18B, the display unit 300 displays the cuvette management screen G5 including the production lot number CN3 "U1000-011".

With this configuration, the display information generation unit 267 generates the second display information after generating the first display information. Therefore, the time when the production lot information is changed can be recognized with a certain level of accuracy.

The display information generation unit 267 generates the display information for displaying the production lot number LI on the cuvettes newly supplied to the first storage section 131 on the display unit 300, when a predetermined amount of cuvettes stored in advance is discharged from the first storage section 131 or when a predetermined period of time elapses after the production lot information acquisition unit 263 has acquired the production lot information LI on the cuvettes newly supplied to the first storage section 131 illustrated in FIGS. 4 to 10 and the like.

As described above, the cuvette replenishing is performed when the number of cuvettes stored in the first storage section 131 becomes small. For example, when the remaining number of stored cuvettes decreases to about 100, 1000 new cuvettes are supplied to the first storage section 131. Thus, when the remaining 100 cuvettes are discharged after the production lot information acquisition unit 263 has acquired the production lot information LI on the cuvettes newly supplied to the first storage section 131, 1000 cuvettes newly supplied are stored in the first storage section 131. Therefore, in such a case, display information for displaying the production lot information LI of the newly supplied cuvette on the display unit 300 is generated. Furthermore, after the production lot information acquisition unit 263 has acquired the production lot information LI on the cuvettes newly supplied to the first storage section 131, the time required for discharging the remaining 100 may be predicted (or set), and the display information for displaying the production lot information LI on the cuvettes newly supplied on the display unit 300 may be generated when such time elapses. The fact that the cuvettes staying in advance and the cuvettes newly supplied coexist will be ignored.

With this configuration, after the production lot information LI of the newly supplied cuvette was acquired, the display information is generated when certain conditions are satisfied as described above. Thus, the time when the production lot information has been changed can be more accurately recognized.

According to the second embodiment described above, when the production lot information acquisition unit 263 acquires the production lot information LI on cuvettes, the display information generation unit 267 generates display information for displaying the production lot information LI on the display unit 300 in a predetermined display manner. Thus, the display unit 300 displays the cuvette management screen including the production lot information, whereby the production lot information LI on the cuvettes supplied to the first storage section 131 can be easily recognized at a glance.

The calculation unit 266 may calculate the amount of cuvettes discharged from the discharge port 150 as the used amount based on the detection results from the discharge port sensor 400. The display information generation unit 267 may generate display information for displaying a cuvette management screen including the used amount, for example. The calculation unit 266 may calculate, as the used amount, the amount of containers discharged from the discharge port 150 after the storage section sensor 350 has stopped detecting the containers (for example, when the number of cuvettes in the first storage section 131 falls below the predetermined amount).

With this configuration, by measuring the used amount of cuvettes stored in the first storage section 131, it is possible to accurately recognize that the amount of containers stored in the first storage section 131 has decreased.

The calculation unit 266 resets the used amount when the production lot information LI on the cuvettes newly supplied to the first storage section 131 is acquired after the calculation of the used amount has started. Then, for example, the used amount is calculated again from 0.

With this configuration, the used amount calculated is reset when the production lot information LI on the cuvettes newly supplied to the first storage section 131 is acquired. Thus, the calculation of the used amount can be resumed when the production lot information LI is newly acquired.

Third Embodiment

Figure 19:
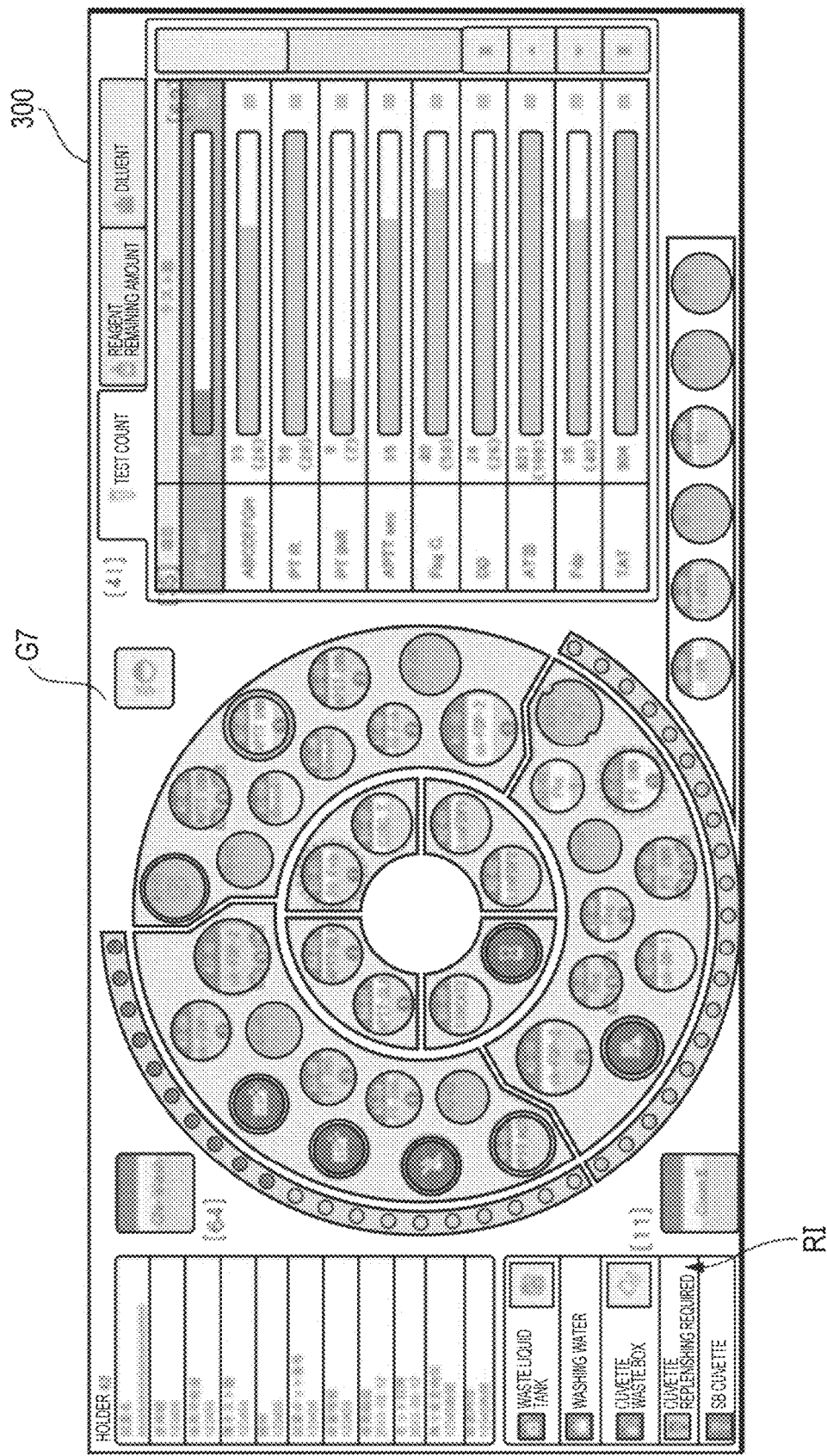
FIG. 19 is an explanatory diagram illustrating an example of a display screen of a display unit of a sample analyzer according to a third embodiment.
Figure 20:
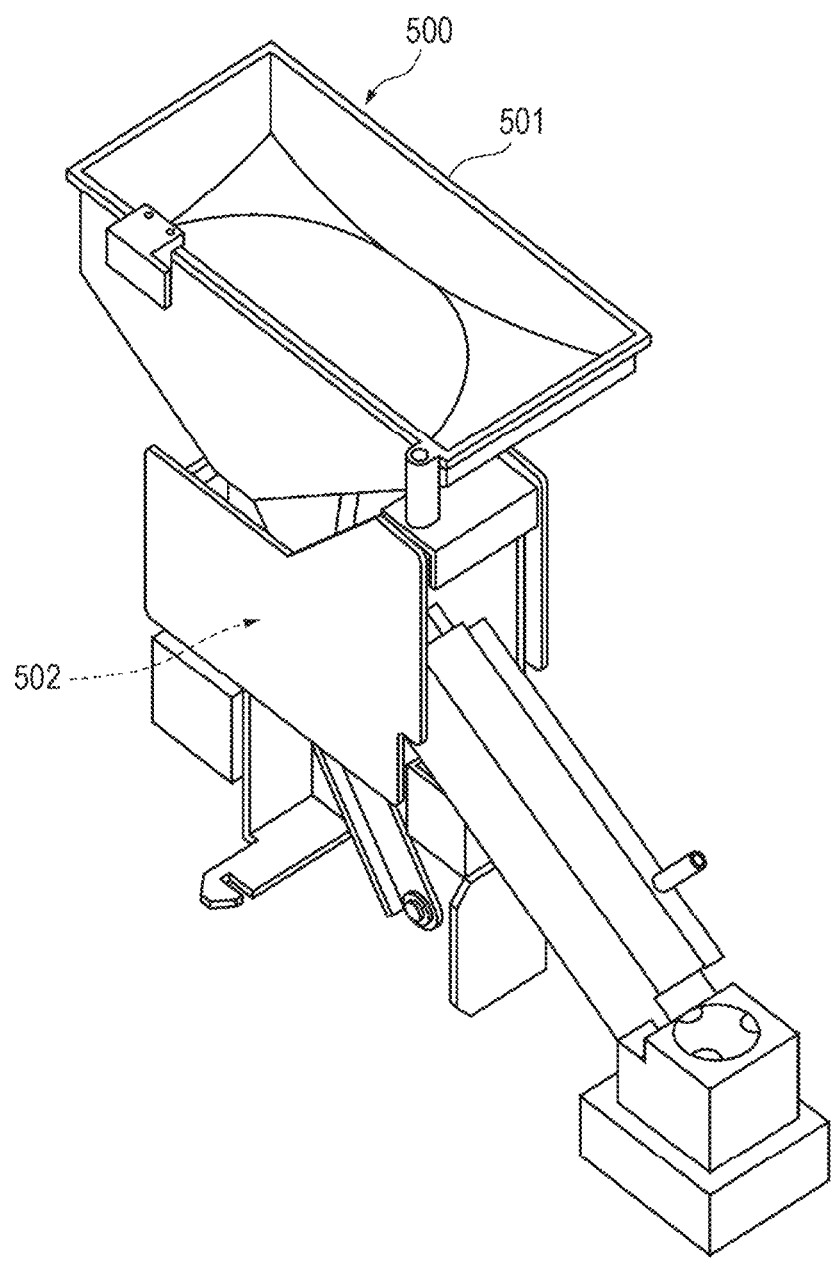
FIG. 20 is a schematic diagram for explaining a configuration according to related technology.

FIG. 19 is an explanatory diagram illustrating an example of a cuvette management screen G7 on the display unit 300 of the sample analyzer 1. As illustrated in FIG. 19, the cuvette management screen G7 includes information RI for prompting cuvette replenishing (supplying). The information RI may be text information such as "replenishing required", image information for prompting the replenishing, or a combination of the text information and the image information.

The display information generation unit 267 illustrated in FIG. 13 generates information for prompting the supplying of the cuvettes, when the amount of cuvettes stored in the first storage section 131 illustrated in FIGS. 4 to 10 and the like decreases to or below a set amount (200, for example). With this configuration, supplying of the cuvettes is prompted when the amount of cuvettes stored in the first storage section 131 becomes small. Thus, it is possible to prompt the user to perform cuvette replenishment at an appropriate timing.

The display information generation unit 267 generates information for prompting supplying of cuvettes based on a result of detecting the presence or absence of the cuvette obtained by the storage section sensor 350 illustrated in FIGS. 8 and 9. With this configuration, it is possible to easily recognize that the amount of containers stored in the first storage section 131 has decreased, whereby the supplying of cuvettes can be prompted at a more appropriate timing.

When a predetermined amount of (800, for example) or more cuvettes stored in the first storage section 131 is discharged from the discharge port 150, the display information generation unit 267 generates information for prompting the supplying of the containers. With this configuration, it is possible to easily recognize that the amount of cuvettes stored in the first storage section 131 has decreased, whereby the supplying of containers can be prompted at a more appropriate timing.

According to the third embodiment described above, the cuvette management screen G7 including the information RI for prompting cuvette replenishing (supplying) is displayed. Therefore, it is possible to prompt the user to perform cuvette replenishing.

Other Embodiments

The above-described embodiments are for facilitating understanding of the present disclosure, and are not to be construed as limiting the present disclosure. The present disclosure can be changed/improved (for example, combining the embodiments, omitting a part of the configuration of each embodiment) without departing from the spirit thereof, and the present disclosure includes equivalents thereof.

What is claimed is:

1. A sample analysis method comprising:
   acquiring production lot information on a production lot of a container for containing a sample;
   analyzing the sample using the container discharged through a discharge port included in a storage section configured to store the container, the sample contained in the container during the analyzing;
   recording the production lot information, an analysis result of the sample contained in the container, and time information related to time of analyzing the sample; and
   generating, based on the recorded information, display information for displaying at least one analysis result of at least one sample analyzed during a predetermined period of time on a display unit in a manner that associates the at least one analysis result with the production lot information.

2. The sample analysis method according to claim 1, wherein generating the display information comprises generating the display information for displaying the production lot information on the display unit in a predetermined display manner.

3. The sample analysis method according to claim 1, wherein generating the display information comprises:
   generating first display information for displaying first production lot information on the container already stored in the storage section on the display unit; and
   when second production lot information on a container newly supplied to the storage section is acquired, generating second display information for displaying the second production lot information on the display unit.

4. The sample analysis method according to claim 1, wherein generating the display information comprises generating display information for displaying production lot information on a container newly supplied to the storage section on the display unit, when a predetermined amount of containers already stored in the storage section are discharged from the storage section or a predetermined period of time elapses after the production lot information on the container newly supplied to the storage section is acquired.

5. The sample analysis method according to claim 1, wherein generating the display information comprises generating information for prompting supplying of the container when an amount of the containers stored in the storage section decreases to or below a set amount.

6. The sample analysis method according to claim 1, wherein generating the display information comprises generating information for prompting supplying of the container based on a detection result of the container by a sensor that is disposed at a predetermined height from a bottom part of the storage section.

7. The sample analysis method according to claim 1, wherein generating the display information comprises generating information for prompting supplying of the container when it is determined that a predetermined amount or more of the containers are discharged through the discharge port, based on a detection result by a sensor that is disposed at the discharge port.

8. The sample analysis method according to claim 1, further comprising calculating an amount of the containers discharged through the discharge port based on a detection result by a first sensor that is disposed at the discharge port, wherein calculating the amount of the containers comprises calculating the amount of the containers discharged through the discharge port after the containers are no longer detected by a second sensor that is disposed at a predetermined height from a bottom part of the storage section.

9. The sample analysis method according to claim 8, wherein calculating the amount of the containers comprises resetting the calculated amount of the containers, when production lot information on a container newly supplied to the storage section is acquired after start of calculating the amount of the containers.

* * * * *